US012784373B2

(12) United States Patent
Goodman et al.

(10) Patent No.: US 12,784,373 B2
(45) Date of Patent: Nov. 3, 2026

(54) ADAPTIVE GESTURE-BASED NAVIGATION FOR ARCHITECTURAL ENGINEERING CONSTRUCTION (AEC) MODELS

(71) Applicant: Autodesk, Inc., San Francisco, CA (US)

(72) Inventors: Aubrey Goodman, San Francisco, CA (US); Elisa Tagliacozzo, San Francisco, CA (US); Adam C. Lusch, Woodridge, IL (US); Manjiri McCoy, Lake Oswego, OR (US); Eric James O'Connell, Portland, OR (US); Ersa Mantashi, Scarborough (CA); Mili Gafni, Hadera (IL); Julian C. Rex, Boxford, MA (US)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 18/946,559

(22) Filed: Nov. 13, 2024

(65) Prior Publication Data

US 2025/0157155 A1 May 15, 2025

Related U.S. Application Data

(60) Provisional application No. 63/598,223, filed on Nov. 13, 2023.

(51) Int. Cl.

*G06T 19/00* (2011.01)
*G06F 3/04815* (2022.01)
*G06F 3/0488* (2022.01)

(52) U.S. Cl.

CPC ........ *G06T 19/003* (2013.01); *G06F 3/04815* (2013.01); *G06F 3/0488* (2013.01); *G06F 2203/04806* (2013.01); *G06F 2203/04808* (2013.01); *G06T 2200/24* (2013.01); *G06T 2210/04* (2013.01); *G06T 2210/12* (2013.01)

(58) Field of Classification Search

CPC ............... G06T 19/003; G06F 3/04842; G06F 3/04845; G06F 3/0488; G06F 3/04812

See application file for complete search history.

(56) References Cited

U.S. PATENT DOCUMENTS 5,850,352 A * 12/1998 Moezzi ................ H04N 13/246 348/E13.058
8,723,811 B2 * 5/2014 Kim ........................ G06F 3/017 345/173

(Continued)

FOREIGN PATENT DOCUMENTS

WO WO-2023145726 A1 * 8/2023 ........... H04N 23/632

*Primary Examiner* — Olga V Merkoulova

(74) *Attorney, Agent, or Firm* — Gates & Cooper LLP

(57) ABSTRACT

A method and system provide the ability to perform a navigation operation of a three-dimensional (3D) model. A 3D model is rendered on a touch screen of a multi-touch device from a camera viewing point a first object of the model is located a first distance from the camera viewing point. An operation (e.g., pan or zoom) is activated using a multi-touch gesture. The operation is performed and behavior of the gesture is adaptive based on the first distance. In alternative embodiments, an inside-outside test is utilized to determine/identify the operation (e.g., an orbit or look-around) is performed. Further, progressive rendering may prioritize objects under the user's focus as defined by finger placement.

26 Claims, 16 Drawing Sheets

(56) References Cited

U.S. PATENT DOCUMENTS

| | | | | |
|---|---|---|---|---|
| 2009/0237371 | A1* | 9/2009 | Kim | G06F 3/0488 345/173 |
| 2011/0043662 | A1* | 2/2011 | Kim | H04N 23/61 396/85 |
| 2016/0301878 | A1* | 10/2016 | Hada | H04N 23/88 |
| 2021/0064217 | A1* | 3/2021 | Mildrew | G06F 3/04815 |
| 2021/0117471 | A1* | 4/2021 | Rav-Acha | G06F 16/7837 |
| 2023/0079307 | A1* | 3/2023 | Mildrew | G06T 15/20 715/740 |
| 2025/0168510 | A1* | 5/2025 | Sato | H04N 23/631 |

* cited by examiner

ADAPTIVE GESTURE-BASED NAVIGATION FOR ARCHITECTURAL ENGINEERING CONSTRUCTION (AEC) MODELS

CROSS-REFERENCE TO RELATED APPLICATIONS

This application claims the benefit under 35 U.S.C. Section 119 (e) of the following commonly-assigned U.S. provisional patent application(s), which is/are incorporated by reference herein:

Provisional Application Ser. No. 63/598,223, filed on Nov. 13, 2023, with inventor(s) Aubrey Goodman, Elisa Tagliacozzo, Adam C. Lusch, Manjiri McCoy, Eric James O'Connell, Ersa Mantashi, Mili Gafni, and Julian C. Rex, entitled "Adaptive Gesture-Based Navigation for Architectural Engineering Construction (AEC) Models,".

BACKGROUND OF THE INVENTION

1. Field of the Invention

The present invention relates generally to architectural, engineering, and construction (AEC) models, and in particular, to a method, apparatus, system, and article of manufacture for a natural adaptive gesture-based navigation of buildings and other AEC models on mobile devices.

2. Description of the Related Art

Users want to view and inspect models of buildings on mobile devices at construction sites. These models are large, both in terms of file size and dimensions (e.g., there are buildings, complexes of buildings, or infrastructure with pipes going long distances). Using well-understood gestures to navigate the model without the need for interacting with buttons, modes, gizmos and other user interface (UI) elements is essential for ease of use and functionality.

Prior art mobile viewers including the Large Model Viewer (LMV) (available from the assignee of the present application) provide such viewing capabilities. Unfortunately, many of these viewers rely on modes, and user interface (UI) elements (gizmos) that the user manipulates to perform camera operations. Further, prior art viewers fail to consistently "keep what's under the fingers, under the fingers", and sometimes fail to support the Android platform to the same extent as iOS (if at all).

SUMMARY OF THE INVENTION

Embodiments of the invention overcome the problems of the prior art. The following describes some of the unique capabilities:

(1) Embodiments of the invention provide a sense of where the camera is in relation to the model, where the gesture behaviors adapt to take that into consideration, instead of relying on the user to switch modes or adjust their input gesture velocity. Embodiments of the invention provide such capability on mobile devices, both internal and external, and equally well on iOS and Android platforms.

(2) the Prior art defines "inside" as within a bounding box, which doesn't work very well. Embodiments of the invention use a floor/ceiling test which is more accurate.

(3) Embodiments of the invention utilize progressive rendering to prioritize bounding volume hierarchy (BVH) meshes that are under the user's focus as defined by placement of their fingers.

BRIEF DESCRIPTION OF THE DRAWINGS

Referring now to the drawings in which like reference numbers represent corresponding parts throughout.

DETAILED DESCRIPTION OF THE INVENTION

Figure 1:
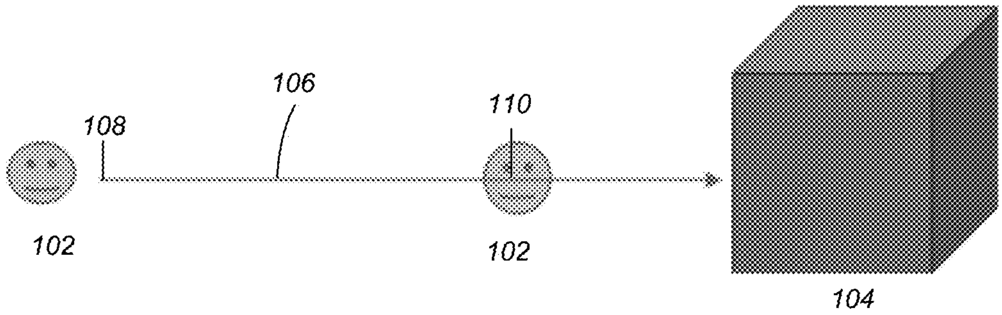
FIG. 1 illustrates an automatic zoom velocity rate based on distance in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide various improvements made to aid the user in easily navigating very large models (buildings, stadiums, refineries etc.) on mobile devices using well-understood gestures.

Embodiments of the invention may also always retain focus on whatever part of the model that the user is focused on, defined by the object under the finger (if using one finger gesture) or the centroid of their fingers (if using two finger gesture).

As described in further detail below, embodiments of the invention provide for an adaptive zoom, an adaptive pan and look around, adaptive orbit/look around switching behavior, gesture based turntable, progressive rendering, and an inside/outside test based on floor AND ceiling. These various capabilities are described in further detail below.

General Description

As described above, users want to view and inspect models of buildings on mobile devices at construction sites. These models are large, both in terms of file size and dimensions. Using well-understood gestures to navigate the model without the need for interacting with buttons, modes, gizmos and other user interface (UI) elements is essential for ease of use and functionality.

A key UX (user experience) paradigm for mobile interaction using gestures is that whatever is under the user's finger or the centroid of their fingers must be prioritized for operation and visualization, and must retain its position with respect to the fingers. With that in mind:

All camera operations, of embodiments of the invention, are designed to take distance to model, FOV (field of view) and finger placement into account such that:

1. A single-finger look around will always keep the object being dragged under the finger to the extent possible.
2. A two finger pinch will always zoom in/out around the object in the centroid of the fingers to the extent possible.
3. A two finger turntable will always pivot around the object/point under the centroid to the extent possible.
4. A two-finger pan will always keep the object being dragged under the finger to the extent possible.

An exception is when other objects are brought in front of the camera by the camera movement e.g., the user moves through a door and the scene changes.

A typical function a user performs is a walk-though (moving towards a building or inside a building, in camera terms a pan and dolly). This is accomplished using a two-finger pinch or drag gesture. Imagine a case where the user opens a file and is outside a building. Now the user wants to move towards the building and walk around inside. Because the model dimensions are large, having a constant rate of gesture motion results in the user making several repetitive gestures to approach the building and causes fatigue.

Some prior art apps solve this issue by using the gesture velocity to speed up or slow down the effect, but that requires the user to adjust how rapidly they gesture. Embodiments of the invention solve this problem by adapting the rate of movement based on the camera distance to the model. If the camera is far away from the building, the gesture causes large movements, which slow down as the user approaches the building. The rate of movement is adjusted using linear interpolation and approaches, but never becomes, zero. This is to allow the user to move through doors and walls. This is done automatically and provides the user with a smooth and easy experience. The same adaptive adjustment is applied when the user moves to the side (pan). At all times, the point under the centroid of their fingers remains under the fingers to the extent possible.

Another issue the user faces on opening a file, is they want to turn the model and look at the back of the building. Embodiments of the invention implement this by using a two-finger rotation gesture to perform a turntable operation. When the user places two fingers on the screen and rotates, the model is turned around the pivot point defined by the model point at the centroid of the fingers, around the world UP axis. As the user moves their fingers to other locations, the pivot point automatically moves to the new centroid location. In case the model has a hole at the centroid (e.g., pipe) the bounding box hit point is used as the pivot to provide the expected result. This lets the user get the result they want without needing to operate on gizmos or switch modes.

When a user is inside a building, the two-finger rotation gesture does a look around. Embodiments of the invention implement/provide an inside/outside heuristic in which a check is performed to determine if the camera is currently under a ceiling AND above a floor. If both are true, the camera is assumed to be inside. The gesture operation switches automatically to look around (camera orientation changes, but not position) in this case.

Embodiments of the invention further implement/provide progressive rendering that can cause some meshes in large models to flicker when the camera moves. To overcome such a problem, embodiments of the invention implement/provide priority rendering for the meshes in the BVH (bounding volume hierarchy) under the fingers so the objects in the user's focus are always rendered first, and the user does not lose the objects of their attention as the camera operates. Hence for the same model, and same general view, the progressive rendering adapts what it prioritizes based on the user's gestures.

Adaptive Zoom

In view of the above, embodiments of the invention provide an adaptive zoom operation. There are two aspects to the adaptive zoom operation: (1) the adaptive zoom operation automatically/autonomously adjusts based on distance; and (2) during the zoom operation, the fingers are automatically/autonomously retained under the fingers.

For a zoom operation, based on how far the user is away from a model, the zoom operation automatically increases the velocity (e.g., moves at a faster rate) when the user is further from an object compared to when the user is closer to an object. Such an automatic zoom velocity rate adjustment is not necessary for mechanical files because the distance between mechanical parts/objects is not great while AEC (architecture, engineering, and construction) files could be 100 s of feet or more. Prior art systems require the user to adjust the operation to control the zoom rate (e.g., by pinching faster to zoom faster and/or unpinching slowly to zoom slower). In contrast to the prior art, embodiments of the invention take distance into account when performing a zoom operation. Thus, the camera adapts to the distance by increasing/decreasing the velocity based on distance.

FIG. 1 illustrates an automatic zoom velocity rate based on distance in accordance with one or more embodiments of the invention. When a user 102 uses a pinch gesture (also referred to as a two-finger zoom) to move towards the model 104, the rate of movement automatically adapts to the distance 106 from the model 104. If the user 102 is far from the model 100 (e.g., at location 108), the rate is fast, and dynamically slows down as the user 102 approaches the model (i.e., is at location 110). The rate is directly proportional to the distance 106 to the focus point (e.g., a centroid and/or a point on/within model 104). In other words, the zoom rate is relative/proportional to the distance 106 such that the zoom rate is faster when the user 102 is further away from the model 104 (e.g., at location 108) compared to when the user 102 is closer to the model 104 (i.e., at location 110), and the zoom rate is slower when closer to the model (i.e., at location 110) (compared to the zoom rate when the user 102 is at location 108).

Figure 2:
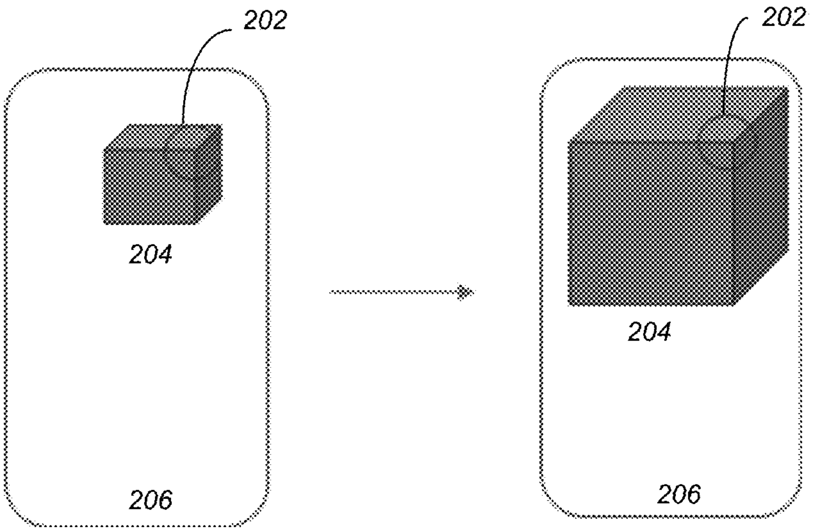
FIG. 2 illustrates the maintaining of the focus point during a zoom operation in accordance with one or more embodiments of the invention.

In addition, the focus point maintains its position on the screen to the extent possible. FIG. 2 illustrates the maintaining of the focus point during a zoom operation in accordance with one or more embodiments of the invention. If the user is zooming into the corner 202 of the square 204, that corner 202 retains its location on the screen 206.

Figure 3B:
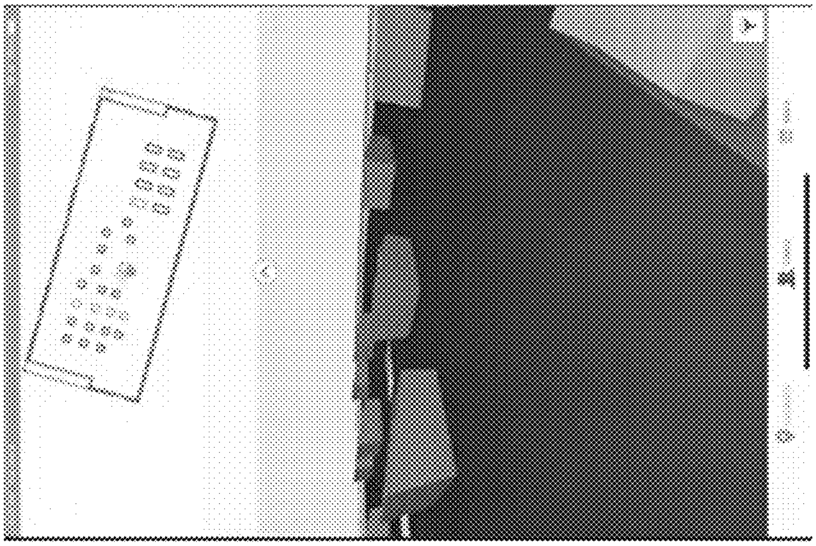
FIG. 3B (Prior Art)
FIGS. 3A and 3B illustrate the prior art where the point is not retained under the centroid when zooming.
Figure 3A:
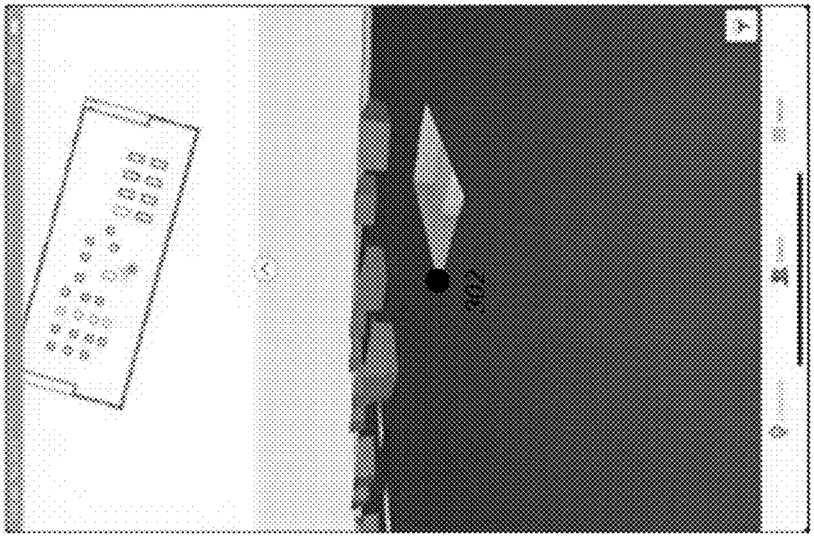
FIG. 3A (Prior Art)

FIGS. 3A and 3B illustrate the prior art where the point is not retained under the centroid when zooming. In FIG. 3A, the user begins the zoom operation. FIG. 3B illustrates how points are not retained under the centroid. In this regard, the user is zooming on point 302 indicated by the black circle. As the user zooms, the corner 302 disappears off screen (as the point 302 cannot be seen in FIG. 3B) illustrating that the focus is not retained in the prior art.

Figure 4:
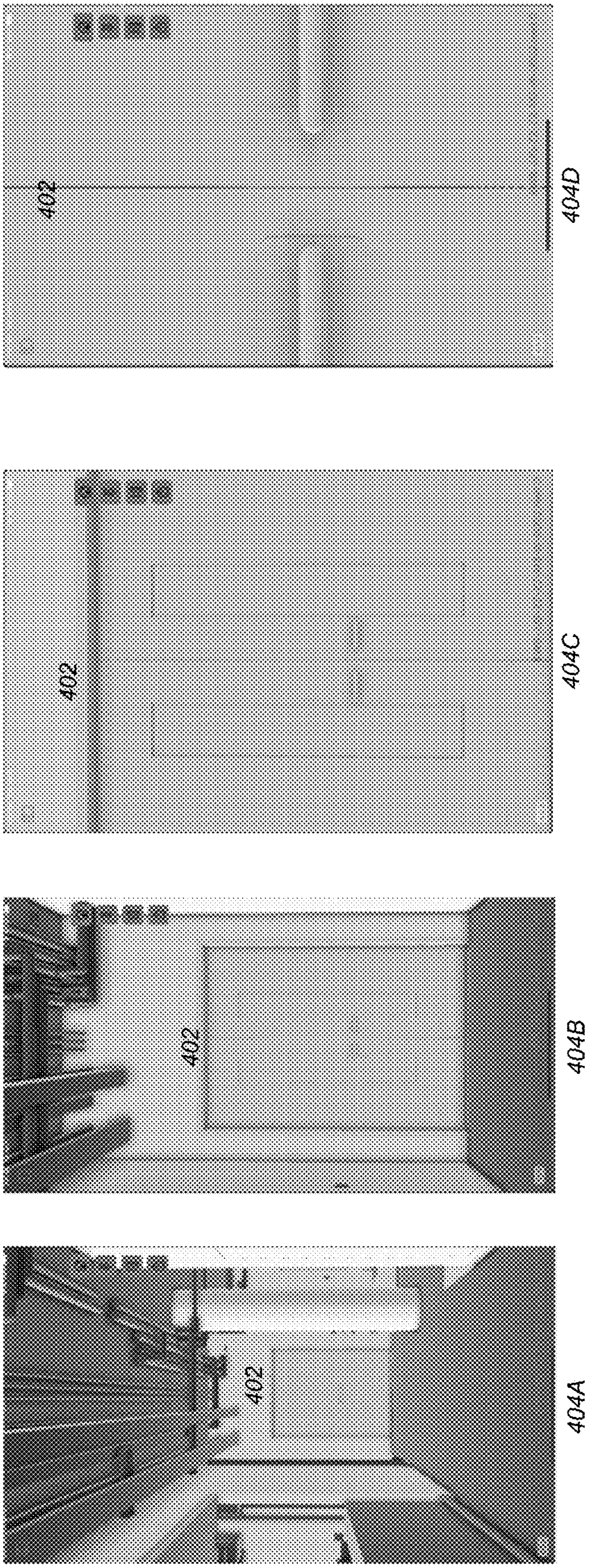
FIG. 4 illustrates an exemplary adaptive zoom operation that modifies the zoom speed in accordance with one or more embodiments of the invention.

In contrast to the prior art, in embodiments of the invention, as the user is zooming, not only does the focus remain under the centroid but the speed adapts based on distance. FIG. 4 illustrates an exemplary adaptive zoom operation that modifies the zoom speed in accordance with one or more embodiments of the invention. As the user approaches door 402 (with different levels of progressive zoom from 404A-404D), the zoom automatically adjusts (without action by the user) such that the zoom is performed at a particular velocity/speed as the user gets closer to door 402. More generally, during the zoom operation, if the user approaches an object (e.g., closed door 402), as the user approaches, the velocity/speed adapts. Once the user goes through the door 402, and a wall on the side of the door is far away, the system recognizes the distance to the object under the zoom operation and adapts the speed of the zoom operation.

Figure 5A:
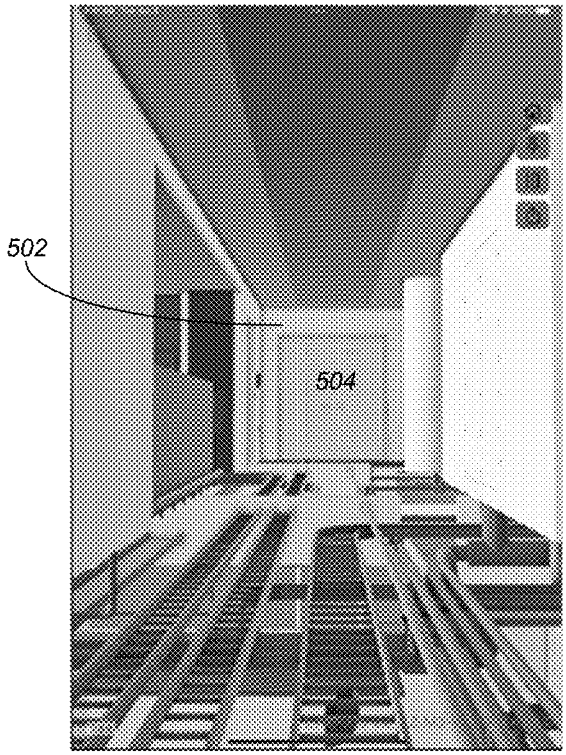
FIG. 5A illustrates an image where the user has passed through door of FIG. 4 in accordance with one or more embodiments of the invention.

FIG. 5A illustrates an image where the user has passed through door 402 of FIG. 4 in accordance with one or more embodiments of the invention. In a single gesture, as the user moves through the door 402 via the zoom operation, on the other side of the door is another wall 502 and a second door 504 further away.

Embodiments of the invention recognize that the user has passed through the first object (i.e., the door 402 of FIG. 4) and that the next object (i.e., the wall 502 and next door 504) is further away, and as such automatically/autonomously adjust the speed of the zoom operation. For example, the speed may automatically adapt and increase when the user is further away from an object compared to when the user is closer to an object.

Figure 5B:
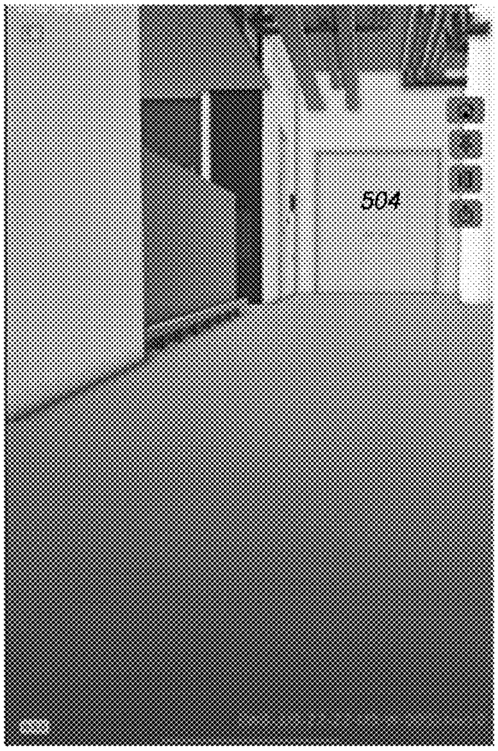
FIGS. 5B-5D show different views that the user has panned to in accordance with one or more embodiments of the invention.
Figure 5C:
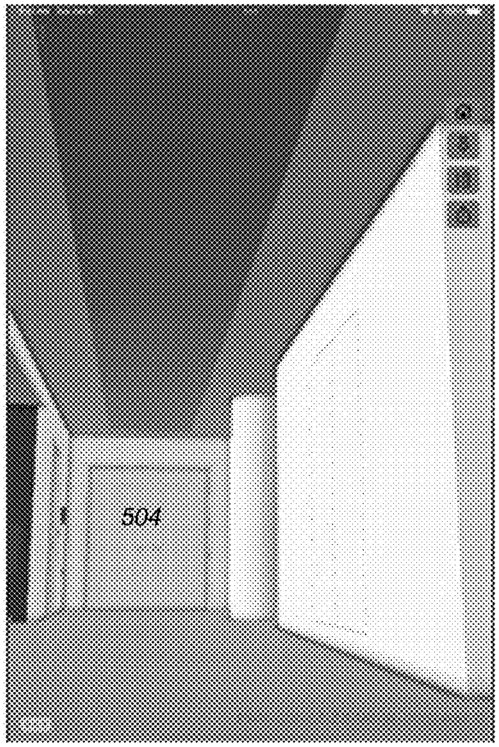
Figure 5D:
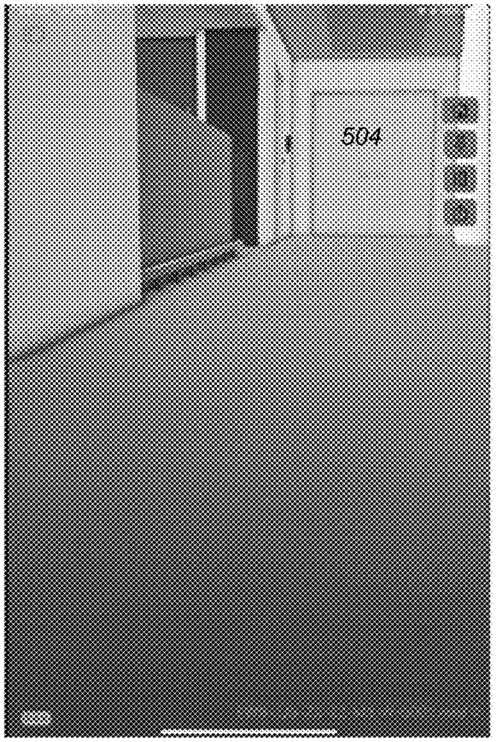

In addition, the focus of the object under the user's finger remains (e.g., during a pan/drag operation). As illustrated in FIGS. 5B-5D, the user's finger remains on the door 504 and as such, the door 504 remains on screen (and does not disappear off screen) while the user is moving the finger to perform a pan operation (the pan operation is performed to move the user around in the image). FIGS. 5B-5D show different views that the user has panned to.

Such a capability provides that the object (e.g., door 504) remains on screen based on the centroid/location of the user's finger and what is under that centroid/finger.

Figure 6:
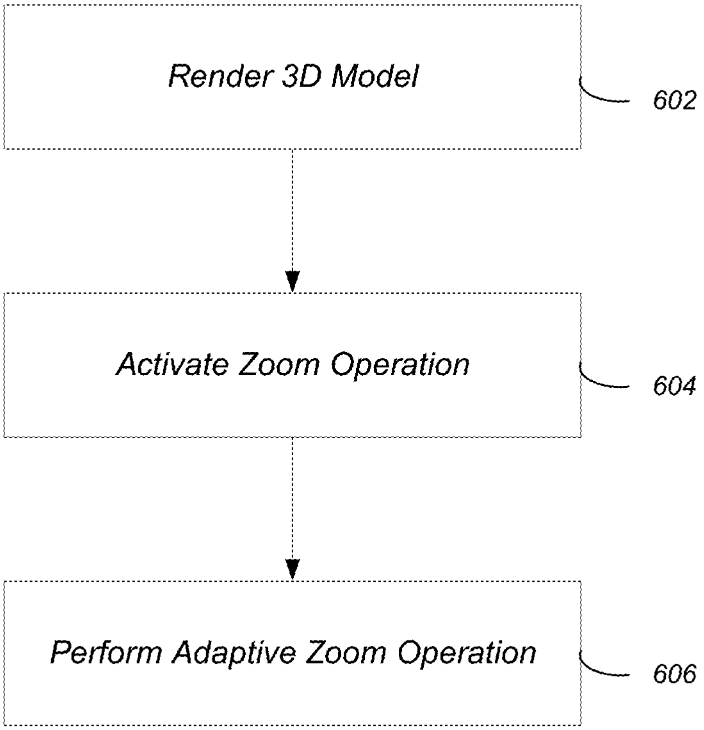
FIG. 6 illustrates the logical flow for navigating within a 3D model in accordance with one or more embodiments of the invention.

FIG. 6 illustrates the logical flow for navigating within a 3D model in accordance with one or more embodiments of the invention.

At step 602, the 3D model (e.g., an architecture, engineering, and construction (AEC) model) is rendered on a touch screen of a multi-touch device. The 3D model is rendered from a camera viewing point and includes a first object located a first distance from the camera viewing point.

At step 604, a zoom operation is activated using a multi-touch gesture (e.g., a pinch gesture) on the touch screen.

At step 606, the zoom operation is performed by adjusting the first distance. The adjusting consists of moving, at an adaptive velocity, the camera viewing point with respect to the first object. Further, the rendering updates the rendering dynamically during the moving. The adaptive velocity autonomously dynamically adjusts during the zoom operation as the first distance adjusts. In addition, the adaptive velocity is a first rate when the camera viewing point is at a first distance from the first object and a second rate when the camera viewing point is closer to the first object. The first rate is slower relative to the second rate. In addition, the adaptive velocity is directly proportional to the first distance.

Further to the above, the zoom operation may be zooming with respect to a focus point that consists of a position on the touch screen. In embodiments of the invention, the focus point retains the position on the touch screen during the zoom operation.

In addition, during the zoom operation, embodiments of the invention may recognize when the camera viewing point has passed the first object. Thereafter, the 3D model is re-rendered based on the camera viewing point. The re-rendering may include a second object located at a second distance from the camera viewing point. The zoom operation then continues by autonomously dynamically adjusting the adaptive velocity based on the second distance.

Adaptive Pan and Look Around

As described above, one or more embodiments of the invention provide an adaptive panning operation in which the objects under the fingers are retained under the fingers and the speed of the pan operation is controlled via the distance to the object. In this regard, for a pan operation, the pan velocity depends on how far the user is from an object in the model. For example, suppose the model includes a sun and a wall, and the user is close to the wall and far from the sun. In such an example, the distance from the camera to the wall/sun determines how fast/slow the pan operation is conducted with respect to the object.

Further, when panning the 3D model, the object under the user's finger(s) will remain under the finger(s) when it is dragged. Embodiments of the invention adapt the camera pan and look around rate proportionally to the distance of the model from the camera eye to accomplish this, also taking the camera FOV (field of view) and screen size into account.

Figure 7A:
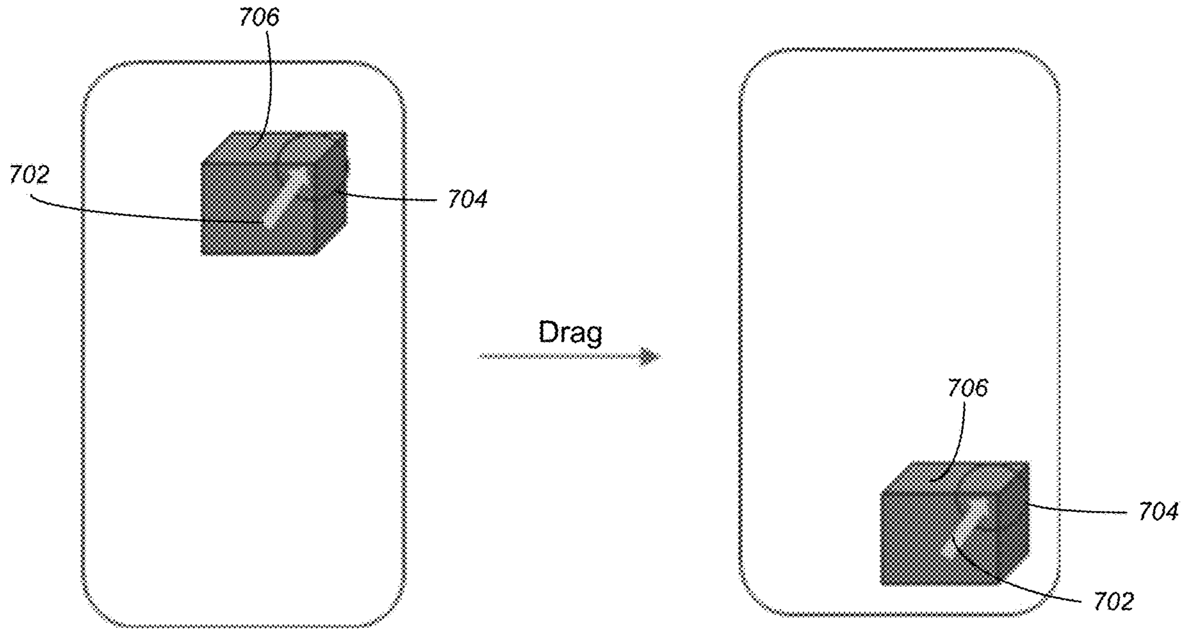
FIGS. 7A-7B illustrate an adaptive pan operation in accordance with one or more embodiments of the invention.
Figure 7B:
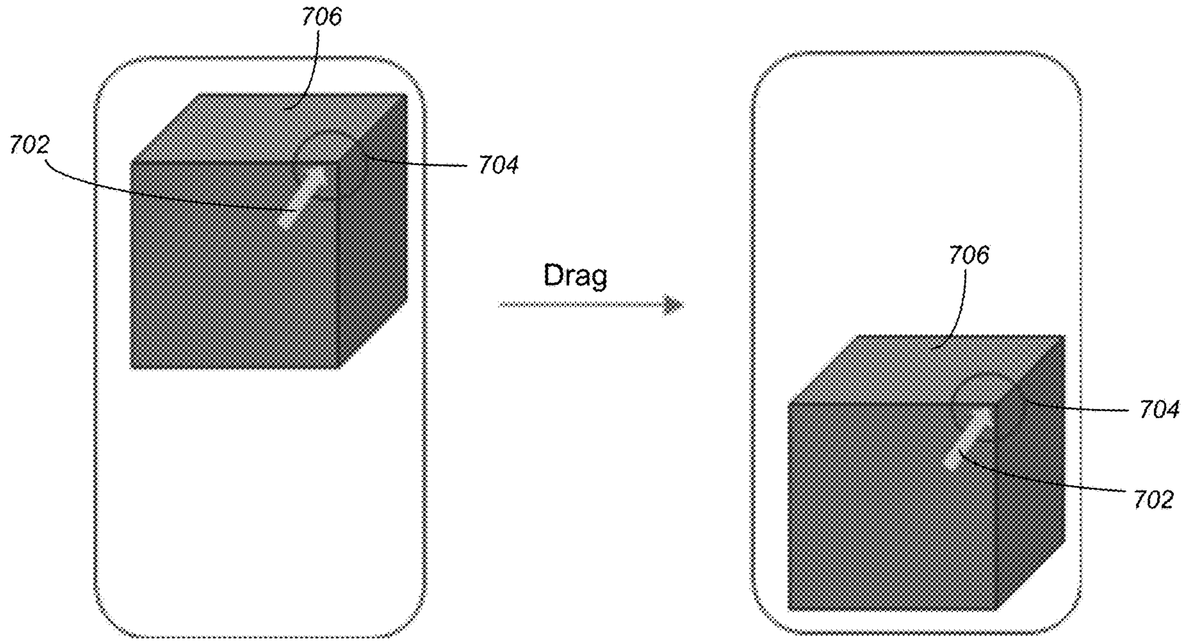

FIGS. 7A-7B illustrate such an adaptive pan operation in accordance with one or more embodiments of the invention. The location/placement of the user's fingers are indicated by the arrows 702 (with the point/center of circle 704 indicating the finger placement). The pan amount is adjusted based on the distance of the user's finger to the object 706. Further, the object 706 under the center/point 704 where the finger is located is retained under the finger during the pan operation.

Figure 8A:
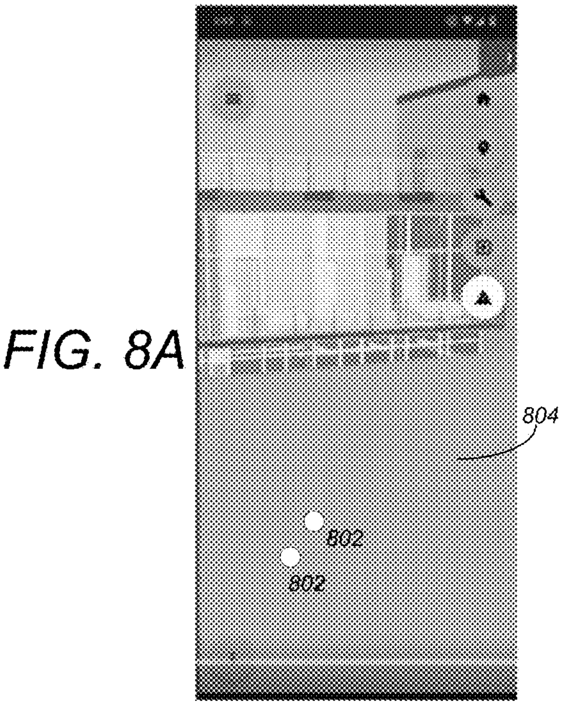
FIGS. 8A and 8B illustrate a two-finger pan operation performed close to an object in a model in accordance with one or more embodiments of the invention.
Figure 8B:
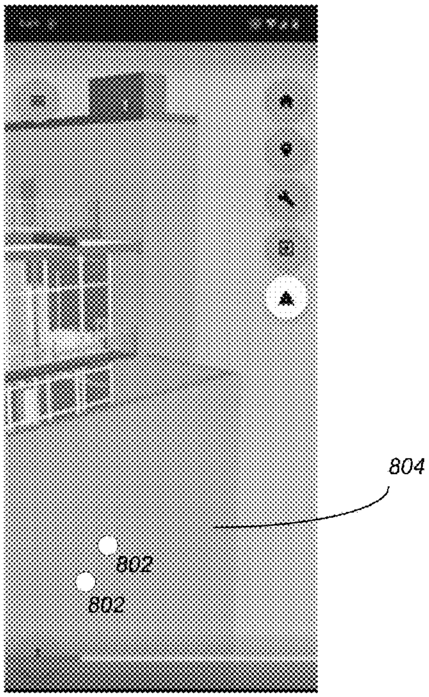

In an example, a pixel translation of 100 pixels of the finger will move the camera physically more when the object is further from the user compared to when the object is closer to the user. Thus, if the user is walking sideways in front of a wall, the camera will move much slower if the wall is in front of the user compared to a sun that is much further away from the user. In this regard, if the user is attempting to pan in a scene while the finger is depressed over a point that identifies/is located over a far object, a 100 pixel translation will move differently compared to if the point identifies/is located over a closer object. As an example, in FIGS. 8A and 8B, the user is performing a two-finger pan operation (with the finger locations illustrated by circles 802). As the user is relatively close to the object/wall 804, a translation of the fingers of 100 pixels will retain the wall object 804 under the fingers during the pan operation and moves the object 804 relatively slowly due to that distance.

Figure 9A:
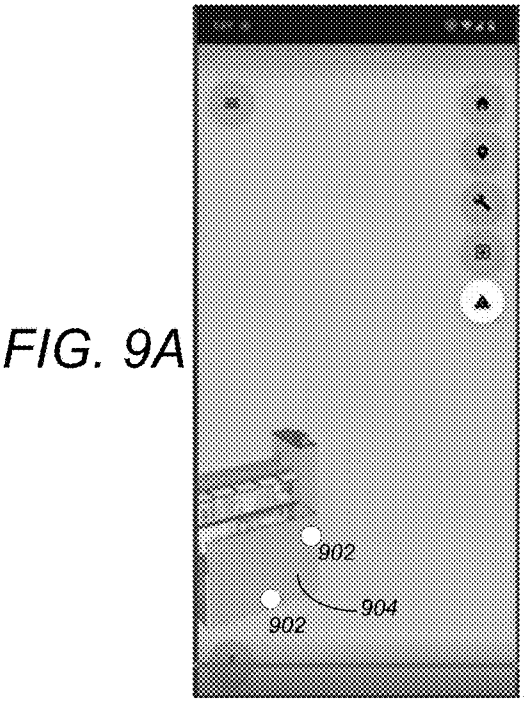
FIGS. 9A and 9B illustrate two finger pan operation performed at a distance from an object in a model in accordance with one or more embodiments of the invention.
Figure 9B:
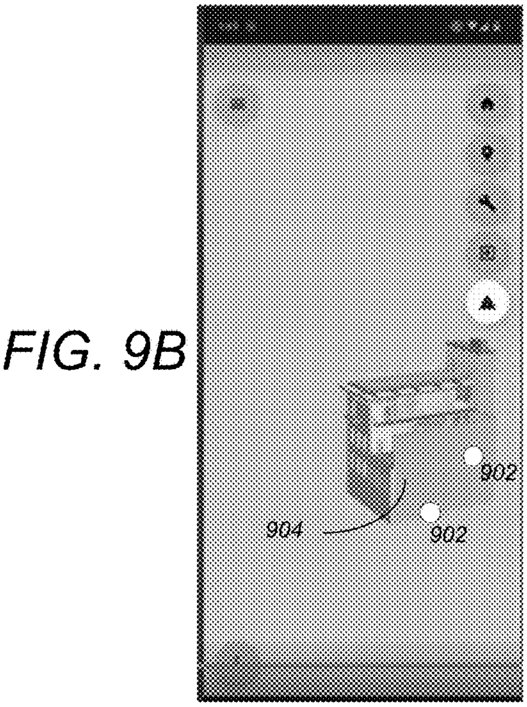

In contrast to the above (where the user is close to the wall 804), in FIGS. 9A and 9B, the user has zoomed out, and the user's fingers 902 are now located over a wall 904 that is much further away from the user. As such, during the pan operation the wall object moves at a much faster rate, and the user must move the camera more to retain the wall 904 under the camera (the wall is moving a lot more and even though the fingers 902 are moving the same 100 pixel distance, the camera is not moving by the same amount). In other words, if the finger is closer to the object, the camera moves less; if the finger is further away from the object, the camera moves to the left/right a lot more compared to when closer to the object.

Accordingly, with the same translation distance of the fingers 802/902, the distance to the object 804/904 is taken into consideration during the pan operation.

Figure 10:
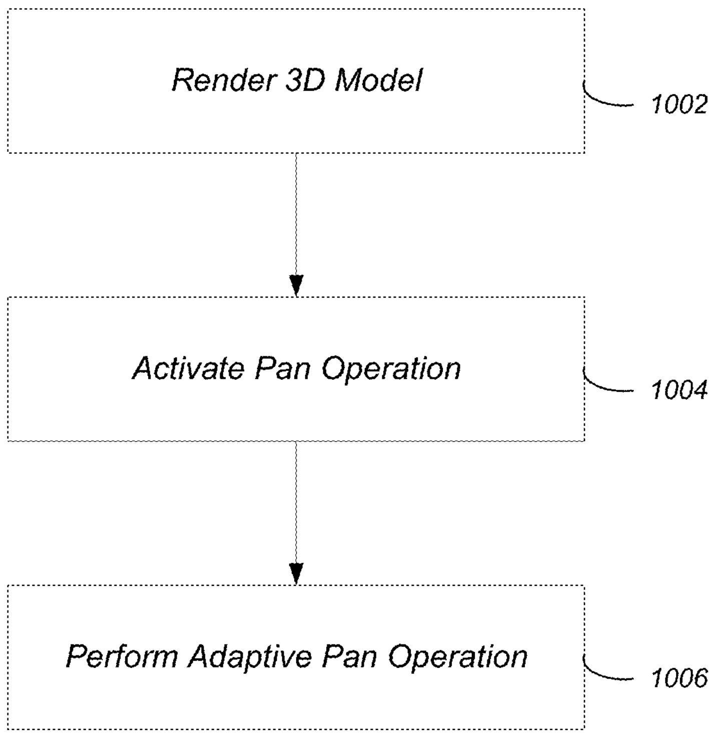
FIG. 10 illustrates the logical flow for conducting an adaptive panning operation in accordance with one or more embodiments of the invention.

FIG. 10 illustrates the logical flow for conducting an adaptive panning operation in accordance with one or more embodiments of the invention.

At step 1002, a 3D model (e.g., an AEC model) is rendered from a camera viewing point on a touch screen of a multi-touch device. The 3D model includes/consists of a first object located a first distance from the camera viewing point.

At step 1004, a pan operation is activated using a multi-touch gesture on the touch screen.

At step 1006, the pan operation is performed. The multi-touch gesture for the pan operation consists of dragging one or more fingers a pixel translation distance while the one or more fingers are in contact with the touchscreen. The pan operation is conducted based on the on the pixel translation distance and the first distance. The pan operation moves the camera viewing point while maintaining the first distance (e.g., the camera view point is translated horizontally/vertically). The pixel translation distance moves the camera viewing point an amount (at a rate/speed) based on the first distance such that the amount increases as the first distance increases. In other words, the pixel translation distance reflects the camera viewing point moving slower when the first object is closer to the camera viewing point compared to when the first object is further away from the from the camera viewing point. In one or more embodiments, the amount/rate is directly proportional to the first distance. Lastly, the rendering updates the rendering dynamically during the pan operation.

Further to the above, in one or more embodiments, the one or more fingers are located over the first object, and the first object is retained under the one or more fingers during the pan operation. In addition, as described above, in one or more embodiments, the pan operation may also be based on a camera field of view and screen size.

Adaptive Orbit/Look Around Switching Behavior

This feature is also referred to as an inside/outside test based on floor/ceiling. As described above, embodiments of the invention implement/provide an inside/outside heuristic in which a check is performed to determine if the camera is currently under a ceiling and above a floor. If both are true, the camera is assumed to be inside. The gesture operation switches automatically to look around (camera orientation changes, but not position) in this case.

In other words, when the user is outside a building, they want a one-finger drag to represent an orbit, where the camera orbits around the object. When they are inside, they want to look around (like a person turning their head around).

Figure 11A:
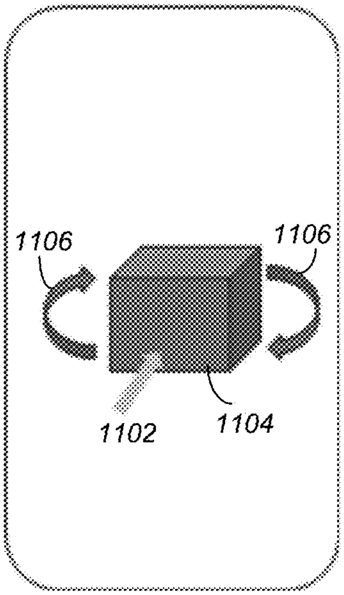
FIGS. 11A and 11B illustrate an exemplary adaptive orbit in accordance with one or more embodiments of the invention.
Figure 11B:
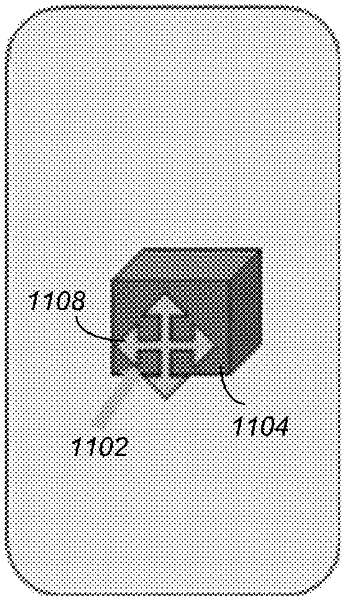

FIGS. 11A and 11B illustrate an exemplary adaptive orbit in accordance with one or more embodiments of the invention. In both FIG. 11A and FIG. 11B, the user has opted to perform an orbit operation by activating a one-finger drag operation at the point indicated by the arrow 1102. In FIG. 11A, a determination has been made that the user is outside of a building, and as such the drag operation will rotate the user around the object 1104 (as indicated by rotational arrows 1106). However, in FIG. 11B, the system has automatically determined that the user is inside of the building and as such, a look-around behavior will be performed by the one-finger drag operation (as indicated by the cross-hatch arrows 1108).

The ability to turn around when inside may not be a new behavior for model viewers. However, embodiments of the invention have improved the determination of what is inside and outside. Embodiments of the invention detect if the camera is under a ceiling (has geometry above it) and above a floor (has geometry below it). If it has both, it is determined to be inside, otherwise the user is determined to be outside. The camera operation for a one finger drag gesture will switch automatically based on this determination.

Figure 12:
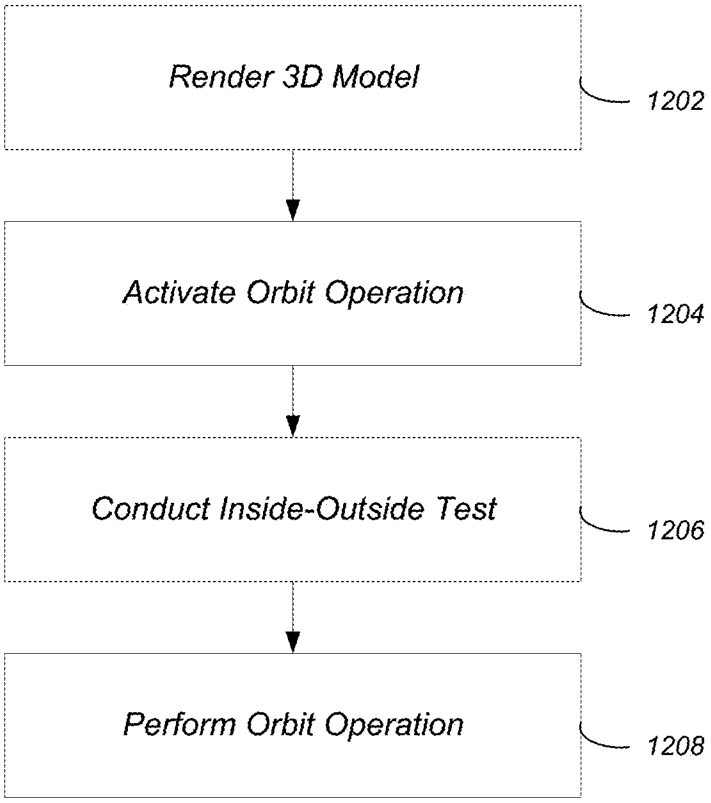
FIG. 12 illustrates the logical flow for an adaptive orbit operation in accordance with one or more embodiments of the invention.

FIG. 12 illustrates the logical flow for an adaptive orbit operation in accordance with one or more embodiments of the invention.

At step 1202, the 3D model is rendered on a touch screen of a multi-touch device. The 3D model is rendered from a camera viewing point, and the 3D model includes a first object located a first distance from the camera viewing point.

At step 1204, an orbit operation is activated using a multi-touch gesture on the touch screen.

At step 1206, an inside-outside test is conducted to determine whether the first camera viewpoint is inside of an object or outside of the object.

At step 1208, the orbit operation is performed. In this regard, the multi-touch gesture consists of dragging one or more fingers a pixel translation distance while the one or more fingers are in contact with the touchscreen (e.g., via a one-finger drag operation). The orbit operation is conducted based on the on the pixel translation distance and the inside-outside test. More specifically, if the inside-outside test determines that the first camera viewpoint is outside of the object, the orbit operation obits around the object. Alternatively, if the inside-outside test determines that the first camera viewpoint is inside of the object, the orbit operation comprises a look around where an orientation of the first camera viewpoint changes and a position of the first camera viewpoint does not change. Further to the above, the rendering updates the rendering dynamically during the orbit operation.

As described above, the inside-outside test may include several steps including determining whether the first camera viewpoint is under a ceiling and determining whether the first camera viewpoint is above a floor. The first camera viewpoint is determined to be inside when the first camera viewpoint is under the ceiling and is above the floor. In contrast, the first camera viewpoint is determined to be outside when the first camera viewpoint is not under the ceiling or is not above the floor. More specifically, the first camera viewpoint is under the ceiling when there is geometry above the first camera viewpoint, and is above the floor when there is geometry below the first camera viewpoint.

The orbit operation is also dynamic in that subsequent to moving the first camera viewpoint to a new location, steps 1206 and 1208 are automatically repeated and the orbit operation will automatically switch to the look around or orbiting around the object depending on the inside-outside test.

Gesture Based Turntable/Adaptive Bounding Box

Figure 13A:
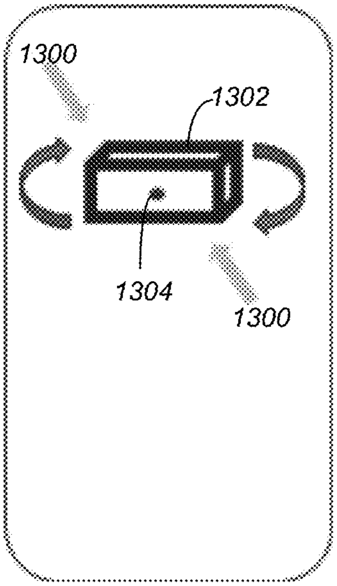
FIGS. 13A and 13B illustrate rectangular cubes that are hollow wire frame objects to demonstrate a gesture based turntable/adaptive bounding box operation in accordance with one or more embodiments of the invention.
Figure 13B:
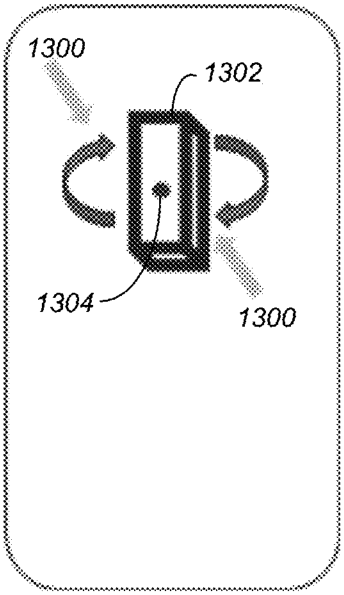

As described above, another issue the user faces on opening a file, is they want to turn the model and look at the back of the building. Embodiments of the invention implement this by using a two-finger rotation gesture to perform a turntable operation. FIGS. 13A and 13B illustrate rectangular cubes that are hollow wire frame objects to demonstrate a gesture based turntable/adaptive bounding box operation in accordance with one or more embodiments of the invention. When the user places two fingers (at the locations identified by arrows 1300) on the screen and rotates, the model 1302 is turned around the pivot point 1304 defined by the model point at the centroid of the fingers, around the world UP axis. As the user moves their fingers to other locations, the pivot point 1304 automatically moves to the new centroid location. In case the model 1302 has a hole at the centroid 1304 (e.g., pipe), a bounding box hit point may be used as the pivot to provide the expected result. This lets the user get the result they want without needing to operate on gizmos or switch modes.

Thus, a two finger turntable will always pivot around the object 1302/point under the centroid 1304 to the extent possible. In one or more embodiments, a bounding box may be used for hollow objects to perform the gesture based turntable operation.

In view of the above, if the user has two fingers on the screen and rotates an object 1302, the object 1302 is rotated about the point 1304 under the finger and the point 1304 is retained at the same screen location. This can be accomplished even if there is no geometry at the center location, by using an alternate point of rotation based on the object bounds.

FIGS. 14A-14D illustrate exemplary screen shots of a pan operation in a model with an object 1400 that has holes 1402 in accordance with one or more embodiments of the invention. When attempting to keep the finger 1404 (represented by circles 1404) above the object 1400, in some instances, the object 1400 may have holes (i.e., may be hollow) so the finger centroid 1404 may not be above any solid object. Accordingly, embodiments of the invention may first test to see if the finger 1404 hits a point on an object 1400. If a point is hit, then that point is used. If no point is hit, embodiments default to the bounds of the object 1400 (e.g., a bounding box) and a determination is made if a bounding box is hit. If a bounding box is hit, then that is used.

As illustrated in FIGS. 14A-14D, as the user performs the drag/pan operation, the finger 1404 is located in the hole 1402 yet the bounding box of the object 1400 (i.e., the plate with holes 1402) is used to retain the focus and the object 1400 under the user's finger 1404 retains the focus (i.e., does not disappear from the screen).

Figure 15:
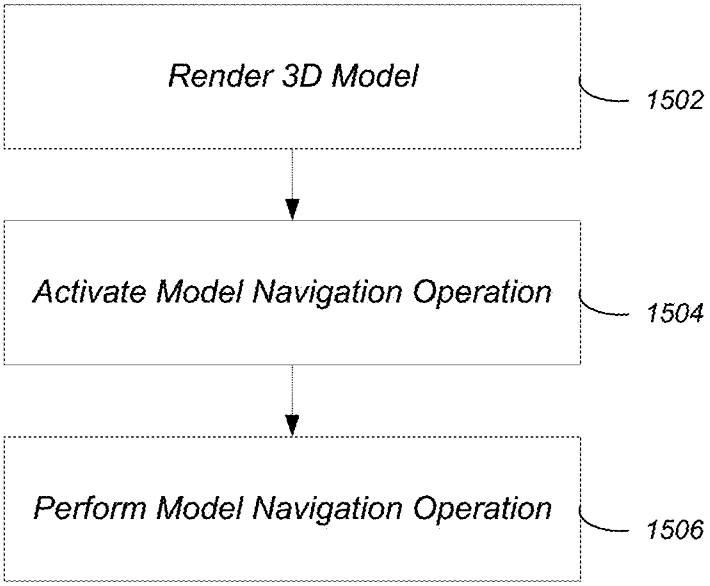
FIG. 15 illustrates the logical flow for performing a model navigation operation using a multi-touch gesture in accordance with one or more embodiments of the invention.
Figure 14A:
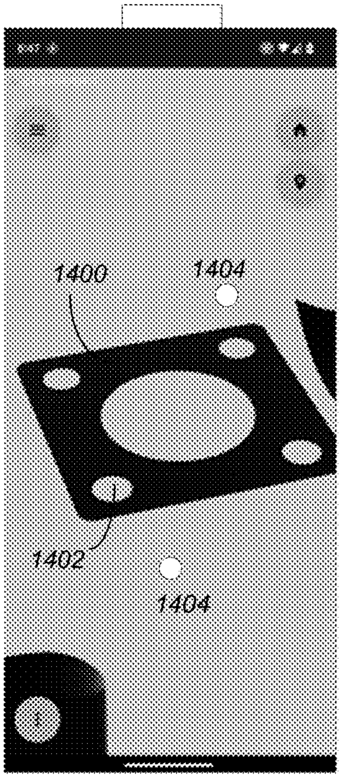
FIGS. 14A-14D illustrate exemplary screen shots of a pan operation performed on an object that has holes in accordance with one or more embodiments of the invention.
Figure 14B:
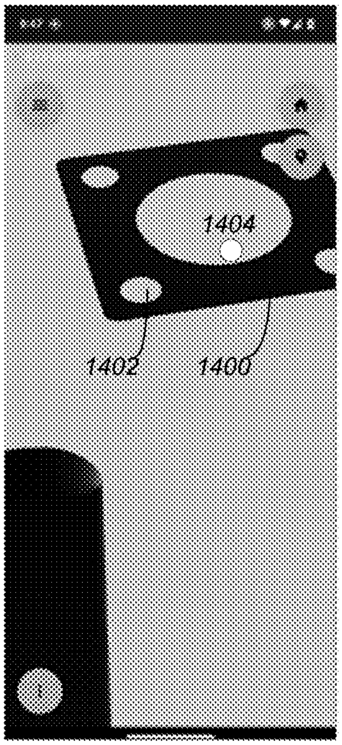
Figure 14C:
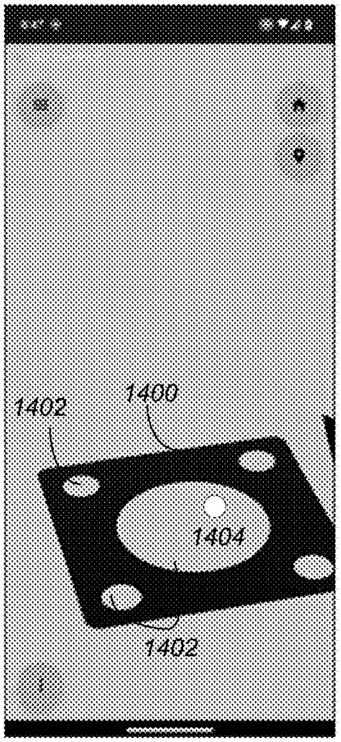
Figure 14D:
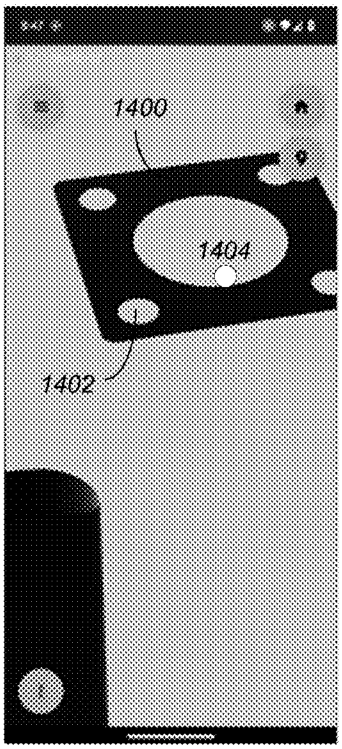

In view of the above, FIG. 15 illustrates the logical flow for performing a model navigation operation using a multi-touch gesture in accordance with one or more embodiments of the invention.

At step 1502, the 3D model is rendered on a touch screen of a multi-touch device from a viewing point. The 3D model consists of one or more objects.

At step 1504, the model navigation operation is activated by placing one or more fingers in contact with the touch screen and moving the one or more fingers.

At step 1506, the model navigation operation is performed. In embodiments, the performance includes determining a centroid point of the one or more fingers followed by a determination of whether geometry of a one of the objects (e.g., a first object) is located under the centroid point. If under the centroid point, the model navigation operation is performed based on the first object and the centroid point. However, if not located under the centroid point (e.g., if there is a hole in the first object and/or the first object is hollow), a bounding box of the first object is determined followed by a determination of whether the bounding box is located under the centroid point. Upon determining that the bounding box is located under the centroid point, the model navigation operation is performed based on the bounding box and the centroid point while retaining focus of the first object.

In step 1506, in one or more embodiments, the multi-touch gesture consists of rotating two fingers around a pivot point while two fingers remain in contact with the touchscreen. With such a gesture, the pivot point is a centroid between the two fingers, the first object is rotated about the pivot point while the pivot point is retained at a same screen location, and as the two-fingers move to another location, the pivot point automatically moves based on an updated location of the centroid.

In step 1506, in one or more embodiments, the model navigation operation is a pan operation, and based on either the bounding box or the first object, the focus on the first object is retained such that the first object does not disappear from the touch screen.

Prioritized Rendering/Progressive Rendering Prioritization Based on Focused Object Embodiments of the invention further take the viewport of objects located under the finger into account when performing an operation. For example, when a pan operation is conducted, whatever is under the finger, is retained under the finger during the pan operation. In addition, this retention of the viewport focus under the finger is consistent across multiple different operations (e.g., zoom, pan, etc.). In addition, the user may navigate from outside of the building to inside of the building.

For example, the focus of the gesture operation remains under the fingers. In this regard, if a zoom operation is performed in a corner, embodiments of the invention retain the focus on the corner and the zoom operation will not cause the corner to disappear/go off screen. In contrast, in prior art systems, when a pinch/zoom operation is conducted on a corner (e.g., of a stairwell), the prior art systems lose focus and the corner will disappear/go off screen.

Further, embodiments of the invention enable progressive rendering where a specific order is followed when performing a rendering operation. In particular, the objects under the finger (e.g., within the viewport located under a user's finger) are rendered first and the reference point is maintained. In other words, progressive rendering prioritization is performed based on a focused object.

In view of the above, when rendering large models and moving the camera at the same time, a technique called "progressive rendering" is used where some parts of the model are drawn while the camera is moving, and the rest of the model is drawn after the camera is done moving. This allows the screen to update in real time as the user moves the camera.

Embodiments of the invention detect the objects under the user's fingers and prioritize them for this render, meaning the objects under focus are always drawn first, so the user does not lose track of the objects they are operating on.

Figure 16:
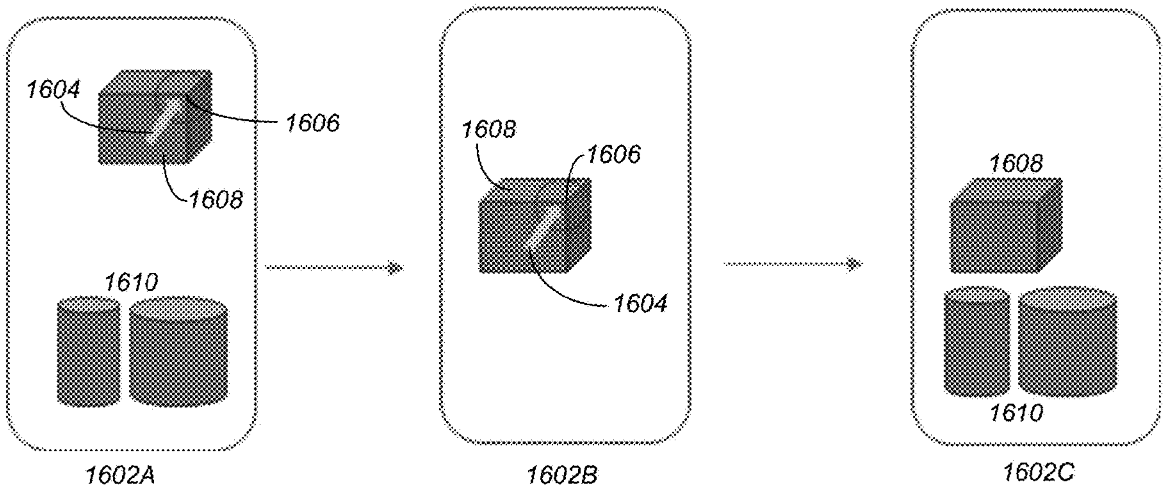
FIG. 16 illustrates prioritized rendering/progressive rendering prioritization based on a focused object in accordance with one or more embodiments of the invention.

FIG. 16 illustrates prioritized rendering/progressive rendering prioritization based on a focused object in accordance with one or more embodiments of the invention. As illustrated, in screen 1602A, the user first performs a multi-touch gesture by touching a finger to the at location 1604 (i.e., the corner 1606 of the box object/cube 1608). Here, the multi-touch gesture signifies a drag operation that starts with the user selecting the upper right corner 1606 of the box/cube 1608. In a poor renderer (or where the renderer is unable to render the cylinders 1610 and the cube 1608), as the drag operation proceeds, prioritization is given to the cube 1608 (because it is located under the user's finger) and as such, the cylinders 1610 may disappear (i.e., the poor renderer is unable to render the cylinders 1610 and cube 1608 and prioritizes the cube 1608) (as illustrated at 1602B). Similarly, if the user had begun the drag operation with a finger 1604 over one of the cylinders 1610, the cube 1608 may disappear during the drag operation. Once the drag operation has completed as indicated at 1602C, the renderer may complete the rendering of all of the objects 1608-1610 (as illustrated at 1602C). In FIG. 16, a pan operation within the model is being conducted and as such, the camera is moving (i.e., the object itself 1608-1610 is not moving within the model).

Figure 17A:
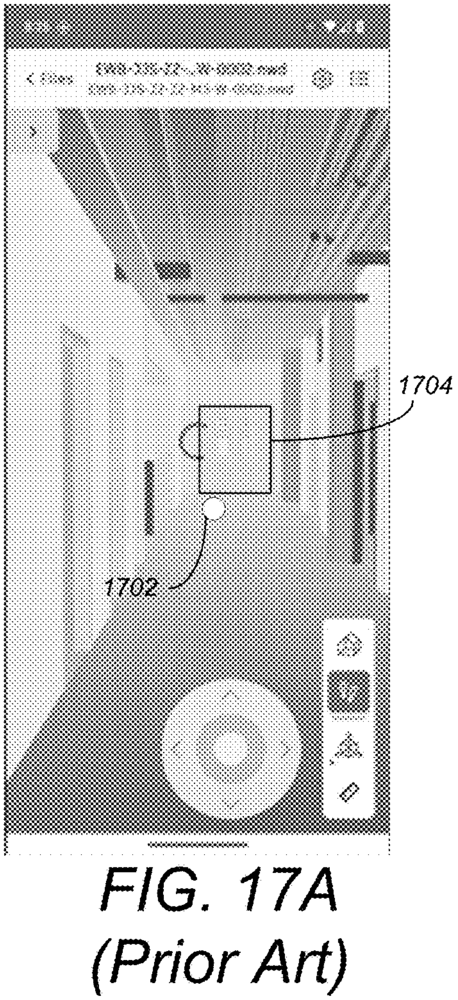
FIG. 17A (Prior Art)
FIGS. 17A and 17B illustrate the prior art where a progressive render is not prioritizing what is under the user's finger.
Figure 17B:
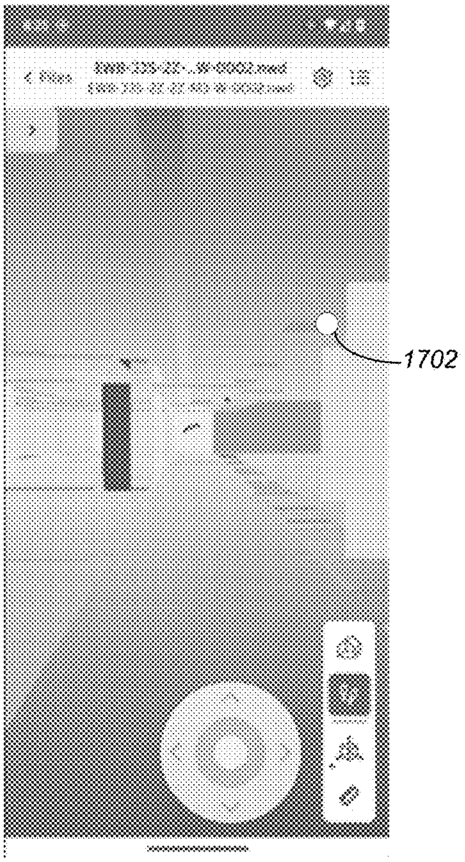
FIG. 17B (Prior Art)

In contrast to the prioritization illustrated in FIG. 16, FIGS. 17A and 17B illustrate the prior art where a progressive render is not prioritizing what is under the user's finger. In FIG. 17A, the user's finger (indicated by circle 1702) and a door 1704 are illustrated. In FIG. 17B, the user's finger 1702 is depressed on the door 1704 but is moving around (e.g., to perform a pan operation). However, while moving the finger 1702, the rendering of what is under the finger 1702 is not prioritized. Instead, as illustrated, the area behind the door 1704 has been rendered and the door 1704 itself disappears. Thus, the prior art fails to prioritize the rendering of what is under the user's finger 1702.

Figure 18A:
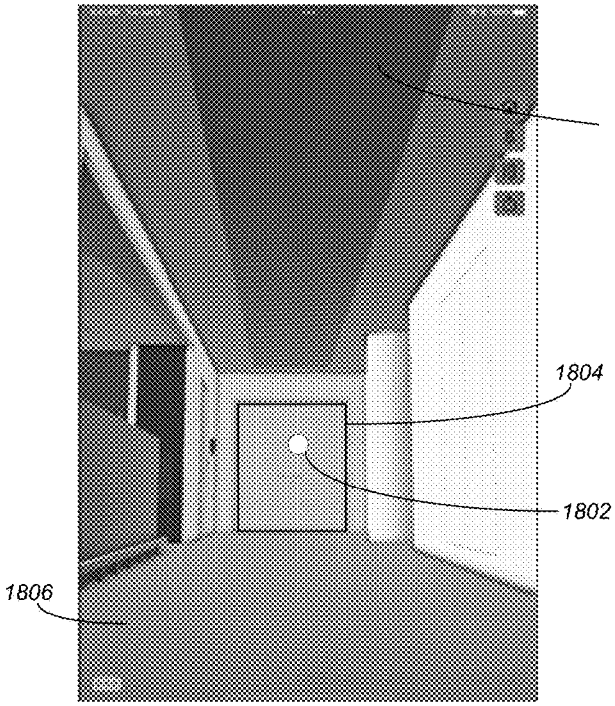
FIGS. 18A-18C illustrate prioritized rendering of objects under a user's finger in accordance with one or more embodiments of the invention.
Figure 18B:
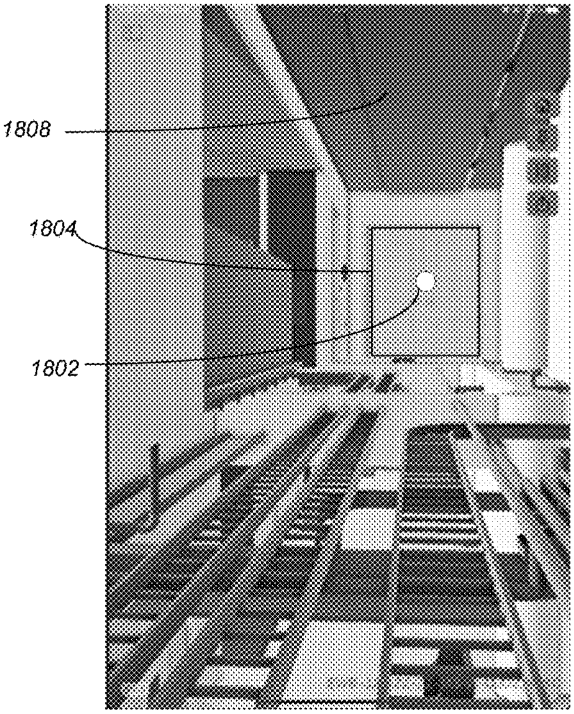
Figure 18C:
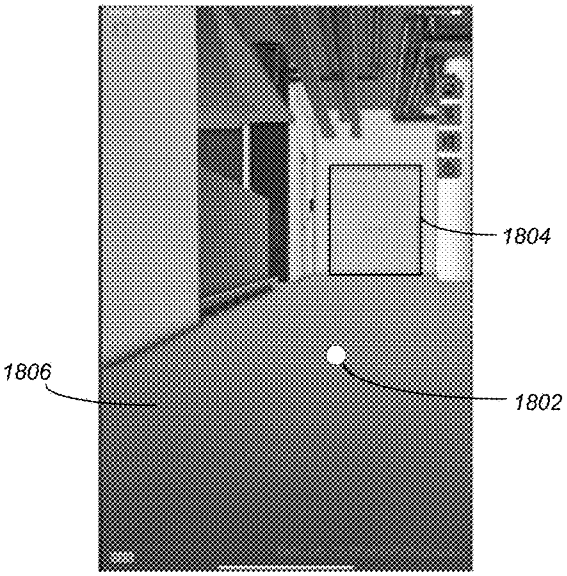

In contrast to the above, embodiments of the present invention prioritize the rendering of the object under the user's finger (regardless of what else is being viewed in the image). FIGS. 18A-18C illustrate prioritized rendering of objects under a user's finger in accordance with one or more embodiments of the invention. Specifically, FIGS. 18A and 18B illustrate that the door 1804 is always rendered as the user's finger is on the door in accordance with one or more embodiments of the invention. As illustrated, the floor 1806 may appear (as illustrated in FIG. 18A) and disappear (as illustrated in FIG. 18B) because the renderer is prioritizing the rendering of the door 1804 and not the floor 1806.

Similarly, if the user's finger 1802 is placed on the floor 1806 (i.e., instead of the door) as illustrated in FIG. 18C, priority would be given to rendering the floor 1806 and as such, the floor 1806 would not appear/disappear as the user navigates/pans in the model. Instead, the ceiling 1808 may flicker/appear/disappear because the focus is now on rendering the floor 1806 instead of the door 1804 (FIG. 18C illustrates a rendering where the ceiling 1808 has disappeared). In this regard, embodiments of the invention prioritize the rendering of what is under the user's finger 1802 to maintain the reference point for the user. In large models, such a prioritization of the user's focus provide a more natural and different approach compared to that of the prior art. Thus, whatever is under the user's finger 1802 is given priority for the rendering.

Figure 19A:
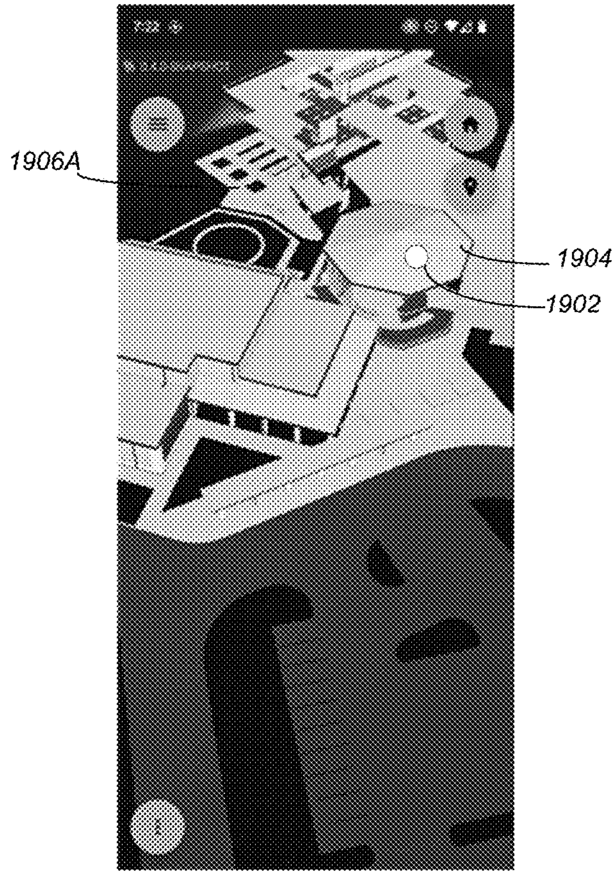
FIGS. 19A and 19B illustrate an alternative model where prioritized rendering is performed for objects under the user's finger in accordance with one or more embodiments of the invention.
Figure 19B:
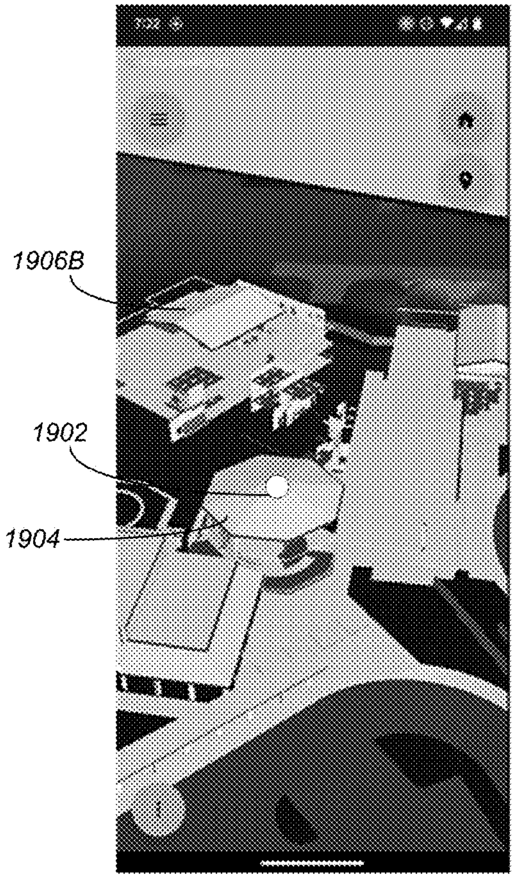

FIGS. 19A and 19B illustrate an alternative model where prioritized rendering is performed for objects under the user's finger in accordance with one or more embodiments of the invention. As illustrated the user's finger 1902 is on the object 1904 with an octagonal roof in the model. During the pan operation where the user's finger 1902 is panning down and to the left (i.e., with the before image in FIG. 19A and the image after panning in FIG. 19B), prioritization is given to the octagonal roof object 1904. As can be seen in FIG. 19B, different objects 1906A and 1906B are displayed between FIGS. 19A and 19B as a result of the prioritization on the octagonal roof object 1904.

Figure 20:
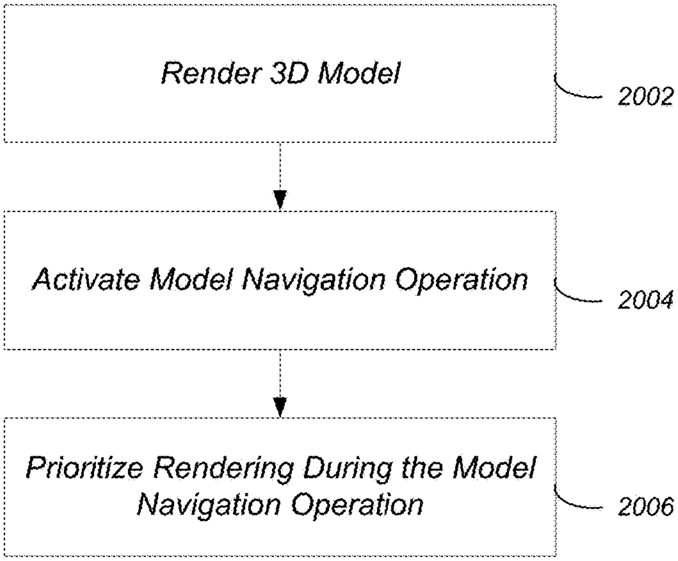
FIG. 20 illustrates the logical flow for prioritized rendering based on a focused object during a model navigation operation of a 3D model in accordance with one or more embodiments of the invention.

FIG. 20 illustrates the logical flow for prioritized rendering based on a focused object during a model navigation operation of a 3D model in accordance with one or more embodiments of the invention.

At step 2002, the 3D model is rendered on a touch screen of a multi-touch device. The 3D model is rendered from a camera viewing point and consists of two or more objects.

At step 2004, a model navigation operation is activated using a multi-touch gesture on the touch screen. The multi-touch gesture consists of placing one or more fingers in contact with the touch screen on top of a first object of the two or more objects and moving the one or more fingers.

At step 2006, the model navigation operation is performed, by moving the camera viewing point based on the moving of the one or more fingers. Further during the model navigation operation, the rendering of the first object is prioritized over the rendering of the other remaining objects (of the two or more objects). Such a prioritization may be performed by rendering the first object before rendering the other objects. In addition, depending on the operation, a position on the touch screen of the first object may also be maintained/retained during the model navigation operation (e.g., in a zoom operation).

Hardware Environment

Figure 21:
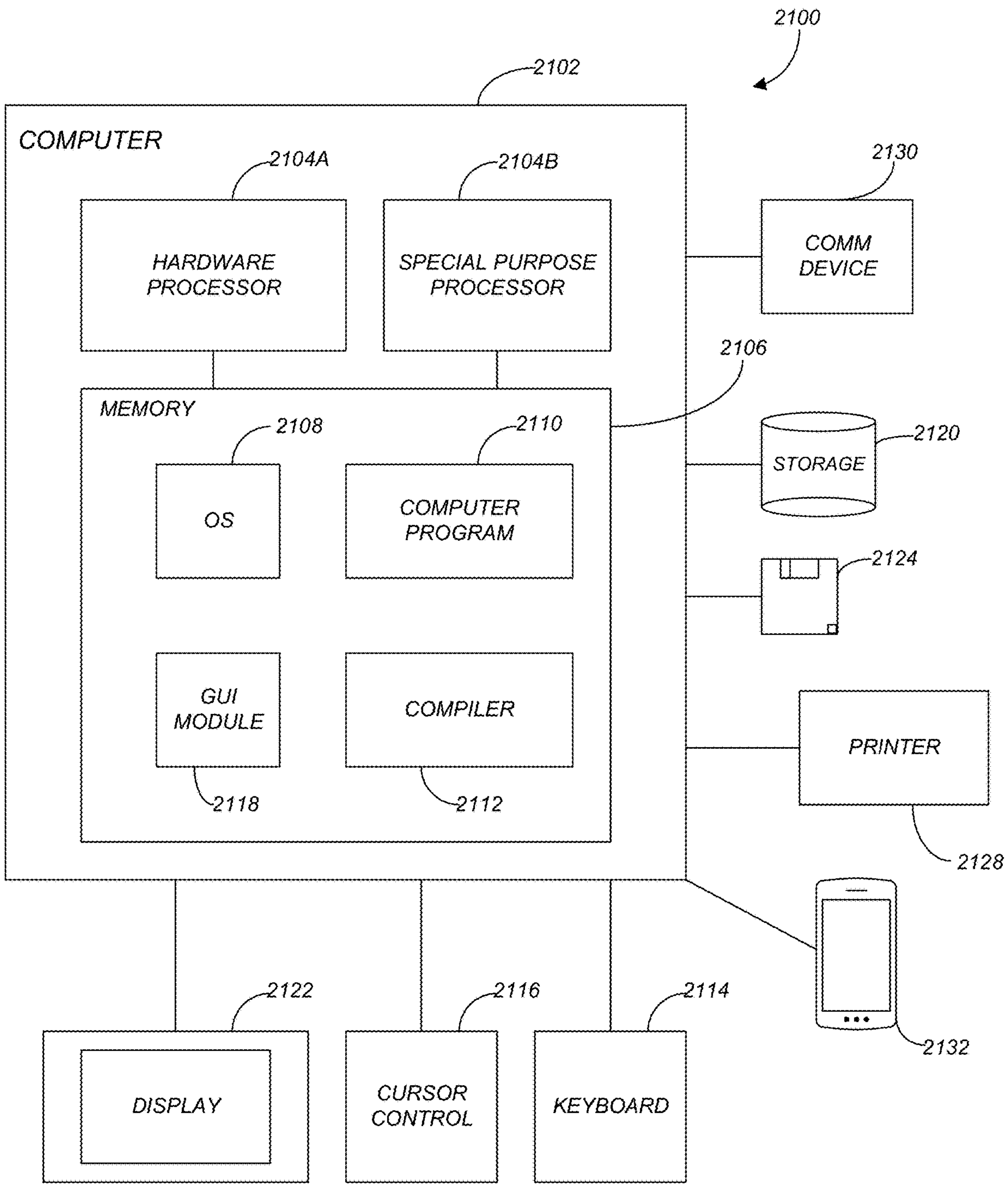
FIG. 21 is an exemplary hardware and software environment 2100 used to implement one or more embodiments of the invention.

FIG. 21 is an exemplary hardware and software environment 2100 (referred to as a computer-implemented system and/or computer-implemented method) used to implement one or more embodiments of the invention. The hardware and software environment includes a computer 2102 and may include peripherals. Computer 2102 may be a user/ client computer, server computer, or may be a database computer. The computer 2102 comprises a hardware processor 2104A and/or a special purpose hardware processor 2104B (hereinafter alternatively collectively referred to as processor 2104) and a memory 2106, such as random access memory (RAM). The computer 2102 may be coupled to, and/or integrated with, other devices, including input/output (I/O) devices such as a keyboard 2114, a cursor control device 2116 (e.g., a mouse, a pointing device, pen and tablet, touch screen, multi-touch device, etc.) and a printer 2128. In one or more embodiments, computer 2102 may be coupled to, or may comprise, a portable or media viewing/listening device 2132 (e.g., an MP3 player, IPOD, NOOK, portable digital video player, cellular device, personal digital assistant, etc.). In yet another embodiment, the computer 2102 may comprise a multi-touch device, mobile phone, gaming system, internet enabled television, television set top box, or other internet enabled device executing on various platforms and operating systems.

In one embodiment, the computer 2102 operates by the hardware processor 2104A performing instructions defined by the computer program 2110 (e.g., a computer-aided design [CAD] application) under control of an operating system 2108. The computer program 2110 and/or the operating system 2108 may be stored in the memory 2106 and may interface with the user and/or other devices to accept input and commands and, based on such input and commands and the instructions defined by the computer program 2110 and operating system 2108, to provide output and results.

Output/results may be presented on the display 2122 or provided to another device for presentation or further processing or action. In one embodiment, the display 2122 comprises a liquid crystal display (LCD) having a plurality of separately addressable liquid crystals. Alternatively, the display 2122 may comprise a light emitting diode (LED) display having clusters of red, green and blue diodes driven together to form full-color pixels. Each liquid crystal or pixel of the display 2122 changes to an opaque or translucent state to form a part of the image on the display in response to the data or information generated by the processor 2104 from the application of the instructions of the computer program 2110 and/or operating system 2108 to the input and commands. The image may be provided through a graphical user interface (GUI) module 2118. Although the GUI module 2118 is depicted as a separate module, the instructions performing the GUI functions can be resident or distributed in the operating system 2108, the computer program 2110, or implemented with special purpose memory and processors.

In one or more embodiments, the display 2122 is integrated with/into the computer 2102 and comprises a multi-touch device having a touch sensing surface (e.g., track pod, touch screen, smartwatch, smartglasses, smartphones, laptop or non-laptop personal mobile computing devices) with the ability to recognize the presence of two or more points of contact with the surface. Examples of multi-touch devices include mobile devices (e.g., IPHONE, ANDROID devices, WINDOWS phones, GOOGLE PIXEL devices, NEXUS S, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 2102 according to the computer program 2110 instructions may be implemented in a special purpose processor 2104B. In this embodiment, some or all of the computer program 2110 instructions may be implemented via firmware instructions stored in a read only memory (ROM), a programmable read only memory (PROM) or flash memory within the special purpose processor 2104B or in memory 2106. The special purpose processor 2104B may also be hardwired through circuit design to perform some or all of the operations to implement the present invention. Further, the special purpose processor 2104B may be a hybrid processor, which includes dedicated circuitry for performing a subset of functions, and other circuits for performing more general functions such as responding to computer program 2110 instructions. In one embodiment, the special purpose processor 2104B is an application specific integrated circuit (ASIC).

The computer 2102 may also implement a compiler 2112 that allows an application or computer program 2110 written in a programming language such as C, C++, Assembly, SQL, PYTHON, PROLOG, MATLAB, RUBY, RAILS, HASKELL, or other language to be translated into processor 2104 readable code. Alternatively, the compiler 2112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 2110 accesses and manipulates data accepted from I/O devices and stored in the memory 2106 of the computer 2102 using the relationships and logic that were generated using the compiler 2112.

The computer 2102 also optionally comprises an external communication device such as a modem, satellite link, Ethernet card, or other device for accepting input from, and providing output to, other computers 2102.

In one embodiment, instructions implementing the operating system 2108, the computer program 2110, and the compiler 2112 are tangibly embodied in a non-transitory computer-readable medium, e.g., data storage device 2120, which could include one or more fixed or removable data storage devices, such as a zip drive, floppy disc drive 2124, hard drive, CD-ROM drive, tape drive, etc. Further, the operating system 2108 and the computer program 2110 are comprised of computer program 2110 instructions which, when accessed, read and executed by the computer 2102, cause the computer 2102 to perform the steps necessary to implement and/or use the present invention or to load the program of instructions into a memory 2106, thus creating a special purpose data structure causing the computer 2102 to operate as a specially programmed computer executing the method steps described herein. Computer program 2110 and/or operating instructions may also be tangibly embodied in memory 2106 and/or data communications devices 2130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 2102.

Figure 22:
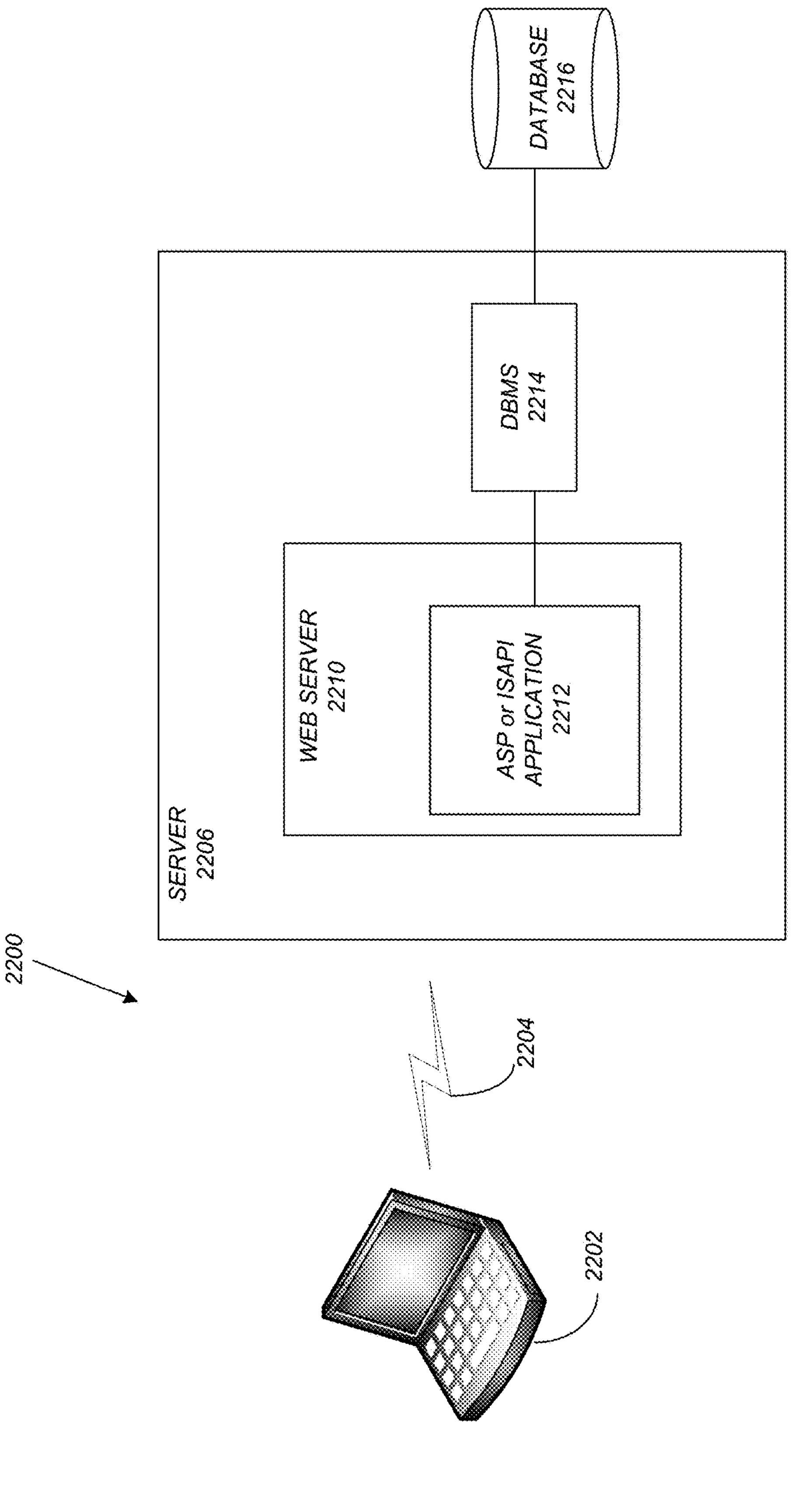
FIG. 22 schematically illustrates a typical distributed/cloud-based computer system utilized in accordance with one or more embodiments of the invention.

FIG. 22 schematically illustrates a typical distributed/cloud-based computer system 2200 using a network 2204 to connect client computers 2202 to server computers 2206. A typical combination of resources may include a network 2204 comprising the Internet, LANs (local area networks), WANs (wide area networks), SNA (systems network architecture) networks, or the like, clients 2202 that are personal computers or workstations (as set forth in FIG. 21), and servers 2206 that are personal computers, workstations, minicomputers, or mainframes (as set forth in FIG. 21). However, it may be noted that different networks such as a cellular network (e.g., GSM [global system for mobile communications] or otherwise), a satellite based network, or any other type of network may be used to connect clients 2202 and servers 2206 in accordance with embodiments of the invention.

A network 2204 such as the Internet connects clients 2202 to server computers 2206. Network 2204 may utilize ethernet, coaxial cable, wireless communications, radio frequency (RF), etc. to connect and provide the communication between clients 2202 and servers 2206. Further, in a cloud-based computing system, resources (e.g., storage, processors, applications, memory, infrastructure, etc.) in clients 2202 and server computers 2206 may be shared by clients 2202, server computers 2206, and users across one or more networks. Resources may be shared by multiple users and can be dynamically reallocated per demand. In this regard, cloud computing may be referred to as a model for enabling access to a shared pool of configurable computing resources.

Clients 2202 may execute a client application or web browser and communicate with server computers 2206 executing web servers 2210. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 2202 may be downloaded from server computer 2206 to client computers 2202 and installed as a plug-in or ACTIVEX control of a web browser. Accordingly, clients 2202 may utilize ACTIVEX components/component object model (COM) or distributed COM (DCOM) components to provide a user interface on a display of client 2202. The web server 2210 is typically a program such as MICROSOFT'S INTERNET INFORMATION SERVER.

Web server 2210 may host an Active Server Page (ASP) or Internet Server Application Programming Interface (ISAPI) application 2212, which may be executing scripts. The scripts invoke objects that execute business logic (referred to as business objects). The business objects then manipulate data in database 2216 through a database management system (DBMS) 2214. Alternatively, database 2216 may be part of, or connected directly to, client 2202 instead of communicating/obtaining the information from database 2216 across network 2204. When a developer encapsulates the business functionality into objects, the system may be referred to as a component object model (COM) system. Accordingly, the scripts executing on web server 2210 (and/or application 2212) invoke COM objects that implement the business logic. Further, server 2206 may utilize MICROSOFT'S TRANSACTION SERVER (MTS) to access required data stored in database 2216 via an interface such as ADO (Active Data Objects), OLE DB (Object Linking and Embedding DataBase), or ODBC (Open DataBase Connectivity).

Generally, these components 2200-2216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 2202 and 2206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 2202 and 2206. Embodiments of the invention are implemented as a software/CAD application on a client 2202 or server computer 2206. Further, as described above, the client 2202 or server computer 2206 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for navigating within a three-dimensional (3D) model, comprising:

(a) rendering the 3D model on a touch screen of a multi-touch device, wherein:
  (i) the 3D model is rendered from a camera viewing point; and
  (ii) the 3D model comprises a first object located a first distance from the camera viewing point;

(b) activating a zoom operation using a multi-touch gesture on the touch screen;

(c) performing the zoom operation by adjusting the first distance, wherein:
  (i) the adjusting comprises moving, at an adaptive velocity, the camera viewing point with respect to the first object;
  (ii) the rendering updates the rendering dynamically during the moving;
  (iii) the adaptive velocity autonomously dynamically adjusts during the zoom operation as the first distance adjusts; and
  (iv) the adaptive velocity comprises a first rate when the camera viewing point is at a first distance from the first object and a second rate when the camera viewing point is closer to the first object.

2. The computer-implemented method of claim 1, wherein the 3D model is an architecture, engineering, and construction (AEC) model.

3. The computer-implemented method of claim 1, wherein the multi-touch gesture comprises a pinch gesture.

4. The computer-implemented method of claim 1, wherein the first rate is faster relative to the second rate.

5. The computer-implemented method of claim 1, wherein the adaptive velocity is directly proportional to the first distance.

6. The computer-implemented method of claim 1, wherein:

the zoom operation is zooming with respect to a focus point;

the focus point comprises a position on the touch screen; and the focus point retains the position on the touch screen during the zoom operation.

7. The computer-implemented method of claim 1, further comprising:

during the zoom operation, recognizing when the camera viewing point has passed the first object;

re-rendering the 3D model based on the camera viewing point wherein the re-rendering comprises a second object located at a second distance from the camera viewing point;

continuing the zoom operation by autonomously dynamically adjusting the adaptive velocity based on the second distance.

8. A computer-implemented method for navigating within a three-dimensional (3D) model, comprising:

(a) rendering the 3D model on a touch screen of a multi-touch device, wherein:

(i) the 3D model is rendered from a camera viewing point; and (ii) the 3D model comprises a first object located a first distance from the camera viewing point;

(b) activating a pan operation using a multi-touch gesture on the touch screen;

(c) performing the pan operation, wherein:

(i) the multi-touch gesture comprises dragging one or more fingers a pixel translation distance while the one or more fingers are in contact with the touch-screen;

(ii) the pan operation is conducted based on the on the pixel translation distance and the first distance, wherein:

(iii) the pan operation moves the camera viewing point while maintaining the first distance;

(iv) the pixel translation distance moves the camera viewing point an amount based on the first distance such that the amount increases as the first distance increases; and (v) the rendering updates the rendering dynamically during the pan operation.

9. The computer-implemented method of claim 8, wherein the pixel translation distance moving the camera viewing point an amount based on the first distance reflects the camera viewing point moving slower when the first object is closer to the camera viewing point compared to when the first object is further away from the camera viewing point.

10. The computer-implemented method of claim 8, wherein:

the one or more fingers are located over the first object; and the first object is retained under the one or more fingers during the pan operation.

11. The computer-implemented method of claim 8, wherein the 3D model is an architecture, engineering, and construction (AEC) model.

12. The computer-implemented method of claim 8, wherein the amount is directly proportional to the first distance.

13. The computer-implemented method of claim 8, wherein the pan operation is further based on a camera field of view and screen size.

14. A computer-implemented method for navigating within a three-dimensional (3D) model, comprising:

(a) rendering the 3D model on a touch screen of a multi-touch device, wherein:

(i) the 3D model is rendered from a first camera viewpoint; and (ii) the 3D model comprises a first object located a first distance from the first camera viewpoint;

(b) activating an orbit operation using a multi-touch gesture on the touch screen;

(c) conducting an inside-outside test to determine whether the first camera viewpoint is inside of an object or outside of the object;

(d) performing the orbit operation, wherein:

(i) the multi-touch gesture comprises dragging one or more fingers a pixel translation distance while the one or more fingers are in contact with the touch-screen;

(ii) the orbit operation is conducted based on the on the pixel translation distance and the inside-outside test, wherein:

(iii) if the inside-outside test determines that the first camera viewpoint is outside of the object, the orbit operation orbits around the object;

(iv) if the inside-outside test determines that the first camera viewpoint is inside of the object, the orbit operation comprises a look around where an orientation of the first camera viewpoint changes and a position of the first camera viewpoint does not change; and (v) the rendering updates the rendering dynamically during the orbit operation.

15. The computer-implemented method of claim 14, wherein the inside-outside test comprises:

determining whether the first camera viewpoint is under a ceiling;

determining whether the first camera viewpoint is above a floor;

determining that the first camera viewpoint is inside when the first camera viewpoint is under the ceiling and is above the floor; and determining that the first camera viewpoint is outside when the first camera viewpoint is not under the ceiling or is not above the floor.

16. The computer-implemented method of claim 15, wherein the inside-outside test determines that the first camera viewpoint is under the ceiling when there is geometry above the first camera viewpoint.

17. The computer-implemented method of claim 15, wherein the inside-outside test determines that the first camera viewpoint is above the floor when there is geometry below the first camera viewpoint.

18. The computer-implemented method of claim 14, further comprising:

moving the first camera viewpoint to a new location;

automatically repeating the inside-outside test and performing the orbiting operation subsequent to the first camera viewpoint moving to a new location, wherein the repeating automatically switches the orbit operation to the look around or orbiting around the object depending on the inside-outside test.

19. The computer-implemented method of claim 14, wherein the multi-touch gesture comprises a one-finger drag operation.

20. A computer-implemented method for navigating within a three-dimensional (3D) model, comprising:

(a) rendering the 3D model on a touch screen of a multi-touch device, wherein:

(i) the 3D model is rendered from a camera viewing point; and (ii) the 3D model comprises one or more objects;

(b) activating a model navigation operation using a multi-touch gesture on the touch screen, wherein the multi-touch gesture comprises placing one or more fingers in contact with the touch screen and moving the one or more fingers;

(c) performing the model navigation operation, by:

(i) determining a centroid point of the one or more fingers;

(ii) determining if a geometry of a first object of the one or more objects is located under the centroid point;

(iii) if the geometry of the first object is located under the centroid point, performing the model navigation operation based on the first object and the centroid point;

(iv) if the geometry of the first object is not located under the centroid point:

(1) determining a bounding box of the first object;

(2) determining that the bounding box is located under the centroid point; and (3) based on the determining that the bounding box is located under the centroid point, performing the model navigation operation based on the bounding box and the centroid point while retaining focus on the first object; and (v) the rendering updates the rendering dynamically during the model navigation operation.

21. The computer-implemented method of claim 20, wherein:

the multi-touch gesture comprises rotating two fingers around a pivot point while two fingers remain in contact with the touchscreen;

the pivot point comprises a centroid between the two fingers;

the first object is rotated about the pivot point and the pivot point is retained at a same screen location;

as the two-fingers move to another location, the pivot point automatically moves based on an updated location of the centroid.

22. The computer-implemented method of claim 20, wherein:

the geometry of the first object is not located under the centroid point when there is a hole in the first object or the first object is hollow.

23. The computer-implemented method of claim 20, wherein:

the model navigation operation comprises a pan operation; and based on either the bounding box or the first object, the focus on the first object is retained such that the first object does not disappear from the touch screen.

24. A computer-implemented method for navigating within a three-dimensional (3D) model, comprising:

(a) rendering the 3D model on a touch screen of a multi-touch device, wherein:

(i) the 3D model is rendered from a camera viewing point; and (ii) the 3D model comprises two or more objects;

(b) activating a model navigation operation using a multi-touch gesture on the touch screen, wherein the multi-touch gesture comprises placing one or more fingers in contact with the touch screen on top of a first object of the two or more objects and moving the one or more fingers;

(c) performing the model navigation operation, by moving the camera viewing point based on the moving of the one or more fingers, wherein during the model navigation operation, rendering of the first object is prioritized over other objects of the two or more objects.

25. The computer-implemented method of claim 24, wherein:

the rendering of the first object is prioritized by rendering the first object before rendering the other objects.

26. The computer-implemented method of claim 24, further comprising:

maintaining a position on the touch screen of the first object during the model navigation operation.

* * * * *